(12) United States Patent
Kinoshita et al.

(10) Patent No.: US 7,656,436 B2
(45) Date of Patent: Feb. 2, 2010

(54) FLICKER REDUCTION METHOD, IMAGE PICKUP DEVICE, AND FLICKER REDUCTION CIRCUIT

(75) Inventors: Masaya Kinoshita, Kanagawa (JP); Makibi Nakamura, Tokyo (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 717 days.

(21) Appl. No.: 10/535,114

(22) PCT Filed: Oct. 16, 2003

(86) PCT No.: PCT/JP03/13237

§ 371 (c)(1),
(2), (4) Date: May 16, 2005

(87) PCT Pub. No.: WO2004/047427

PCT Pub. Date: Jun. 3, 2004

(65) Prior Publication Data

US 2006/0055823 A1    Mar. 16, 2006

(30) Foreign Application Priority Data

Nov. 18, 2002  (JP) .............................. 2002-333158
Jun. 18, 2003  (JP) .............................. 2003-173642

(51) Int. Cl.
*H04N 9/73* (2006.01)
*H04N 5/228* (2006.01)

(52) U.S. Cl. .................... 348/226.1; 348/222.1

(58) Field of Classification Search ................. 348/511, 348/607, 226.1, 619, 447, 227.1, 228.1, 618
See application file for complete search history.

(56) References Cited

U.S. PATENT DOCUMENTS

| | | | |
|---|---|---|---|
| 6,195,127 B1 * | 2/2001 | Sugimoto | 348/370 |
| 6,441,856 B1 * | 8/2002 | Sugimoto | 348/371 |
| 6,710,818 B1 * | 3/2004 | Kasahara et al. | 348/607 |
| 6,850,278 B1 * | 2/2005 | Sakurai et al. | 348/302 |
| 7,298,401 B2 * | 11/2007 | Baer | 348/226.1 |

FOREIGN PATENT DOCUMENTS

| | | |
|---|---|---|
| EP | 1 091 571 | 4/2001 |
| JP | 11-122513 | 4/1999 |
| JP | 11-252446 | 9/1999 |
| JP | 2001-119708 | 4/2001 |
| JP | 2003-198932 | 7/2003 |

* cited by examiner

*Primary Examiner*—Timothy J Henn
*Assistant Examiner*—Amy Hsu
(74) *Attorney, Agent, or Firm*—Frommer Lawrence & Haug LLP; William S. Frommer; Thomas F. Presson

(57) ABSTRACT

A system and method in which a fluorescent light flicker characteristic of an XY addressing type image pickup device such as a CMOS image pickup device is accurately detected and reliably and sufficiently reduced. This is achieved through signal processing without using a photosensitive element regardless of the level of a video signal of a subject and the type of a fluorescent lamp. A signal In'(x,y) is an RGB primary color signal or a luminance signal, each containing a flicker component. The signal In'(x,y) is integrated over a duration of time equal to or longer than one horizontal period, and a difference value between the integrated values of adjacent fields is normalized by the average value of the integrated values of three consecutive fields.

40 Claims, 30 Drawing Sheets

| STATE | DETERMINATION CRITERIA | CONTROL MODE |
|---|---|---|
| STABLE STATE UNDER LIGHT OF FLUORESCENT LAMP (REGULAR FLICKER) | · THROUGHOUT A PLURALITY OF PAST FIELDS<br>$\gamma m$ :ENERALLY CONSTANT<br>$\Phi mn$ :GENERALLY CONSTANT EVERY CONSTANT NUMBER OF PERIODS<br>AE CONTROL INFORMATION :SCREEN LIGHTNESS VARYING EVERY CONSTANT NUMBER OF PERIODS<br>AWB CONTROL INFORMATION :DETERMINED ALMOST AS BEING UNDER "LIGHT OF FLUORESCENT LAMP" | MODE A |
| STABLE STATE UNDER LIGHT OF NON-FLUORESCENT LAMP (FLICKERLESS) | · THROUGHOUT A PLURALITY OF PAST FIELDS<br>$\gamma m$ :RANDOMLY VARYING IN THE VICINITY OF ZERO (NOISE COMPONENT ONLY)<br>$\Phi mn$ :RANDOMLY VARYING<br>AE CONTROL INFORMATION :NO PERIODICITY IN SCREEN LIGHTNESS<br>AWB CONTROL INFORMATION :DETERMINED ALMOST AS BEING UNDER "LIGHT OF NON-FLUORESCENT LAMP" | MODE B |

Fig.16

Fig.17A $$In'(x,y) = [1 + \Gamma n(y)] * In(x,y) \quad \cdots (1)$$

WHERE $$\Gamma n(y) = \sum_{m=1}^{\infty} \gamma m * \cos[m * (2\pi/\lambda o) * y + \Phi mn]$$

$$= \sum_{m=1}^{\infty} \gamma m * \cos(m * \omega o * y + \Phi mn) \quad \cdots (2)$$

$$\Delta \Phi mn = (-2\pi/3) * m \quad \cdots (3)$$

Fig.17B $$Fn(y) = \sum_x In'(x,y) = \sum_x \{[1 + \Gamma n(y)] * In(x,y)\}$$

$$= \sum_x In(x,y) + \Gamma n(y) \sum_x In(x,y)$$

$$= \alpha n(y) + \alpha n(y) * \Gamma n(y) \quad \cdots (4)$$

WHERE $$\alpha n(y) = \sum_x In(x,y) \quad \cdots (5)$$

Fig.18A $$AVE[Fn(y)] = (1/3) \sum_{k=0}^{2} Fn\_k(y)$$

$$= (1/3)\left\{\sum_{k=0}^{2} \alpha n\_k(y) + \alpha n\_k(y) * \Gamma n\_k(y)\right\}$$

$$= (1/3) \sum_{k=0}^{2} \alpha n\_k(y) + (1/3) \sum_{k=0}^{2} \alpha n\_k(y) * \Gamma n\_k(y)$$

$$= \alpha n(y) + (1/3) * \alpha n(y) \sum_{k=0}^{2} \Gamma n\_k(y)$$

$$= \alpha n(y) \qquad \cdots (6)$$

WHERE $$\alpha n(y) \cong \alpha n\_1(y) \cong \alpha n\_2(y) \qquad \cdots (7)$$

Fig.18B $$Fn(y) - Fn\_1(y)$$
$$= \{\alpha n(y) + \alpha n(y) * \Gamma n(y)\} - \{\alpha n\_1(y) + \alpha n\_1(y) * \Gamma n\_1(y)\}$$
$$= \alpha n(y) * \{\Gamma n(y) - \Gamma n\_1(y)\}$$
$$= \alpha n(y) \sum_{m=1}^{\infty} \gamma m * \{\cos(m * \omega o * y + \Phi mn)$$
$$\qquad - \cos(m * \omega o * y + \Phi mn\_1)\}$$
$$\qquad \cdots (8)$$

Fig.19A $$g_n(y) = \{F_n(y) - F_{n\_1}(y)\} / AVE[F_n(y)]$$

$$= \sum_{m=1}^{\infty} \gamma_m * \{\cos(m*\omega_o*y + \Phi_{mn})$$
$$\qquad\qquad - \cos(m*\omega_o*y + \Phi_{mn\_1})\}$$

$$= \sum_{m=1}^{\infty} (-2)\gamma_m \{\sin[m*\omega_o*y + (\Phi_{mn} + \Phi_{mn\_1})/2]$$
$$\qquad\qquad * \sin[(\Phi_{mn} - \Phi_{mn\_1})/2]\}$$

$$\cdots (9)$$

Fig.19B $$g_n(y) = \sum_{m=1}^{\infty} (-2)\gamma_m * \sin(m*\omega_o*y + \Phi_{mn} + m*\pi/3)$$
$$\qquad\qquad * \sin(-m*\pi/3)$$

$$= \sum_{m=1}^{\infty} 2*\gamma_m * \cos(m*\omega_o*y + \Phi_{mn} + m*\pi/3 - \pi/2)$$
$$\qquad\qquad * \sin(m*\pi/3)$$

$$= \sum_{m=1}^{\infty} 2*\gamma_m * \sin(m*\pi/3)$$
$$\qquad\qquad * \cos(m*\omega_o*y + \Phi_{mn} + m*\pi/3 - \pi/2)$$

$$= \sum_{m=1}^{\infty} |A_m| * \cos(m*\omega_o*y + \theta_m) \qquad \cdots (10)$$

WHERE $$|A_m| = 2*\gamma_m*\sin(m*\pi/3) \qquad \cdots (11a)$$

$$\theta_m = \Phi_{mn} + m*\pi/3 - \pi/2 \qquad \cdots (11b)$$

Fig.20A
$$\gamma m = |Am|/[2*\sin(m*\pi/3)] \quad \cdots (12a)$$
$$\Phi mn = \theta m - m*\pi/3 + \pi/2 \quad \cdots (12b)$$

Fig.20B
$$DFT[gn(y)] = Gn(m) = \sum_{i=0}^{L-1} gn(i)*W^{m*i} \quad \cdots (13)$$
WHERE
$$W = \exp[-j*2\pi/L] \quad \cdots (14)$$

Fig.20C
$$|Am| = 2*|Gn(m)|/L \quad \cdots (15a)$$
$$\theta m = \tan^{-1}\{Im[Gn(m)]/Re[Gn(m)]\} \quad \cdots (15b)$$
WHERE
Im[Gn(m)] :IMAGINARY PART
Re[Gn(m)] :REAL PART Fig.20D
$$\gamma m = |Gn(m)|/[L*\sin(m*\pi/3)] \quad \cdots (16a)$$
$$\Phi mn = \tan^{-1}\{Im[Gn(m)]/Re[Gn(m)]\} - m*\pi/3 + \pi/2 \quad \cdots (16b)$$

Fig.20E
$$In(x,y) = In'(x,y)/[1+\Gamma n(y)] \quad \cdots (17)$$

Fig.21A $$g_n(y) = F_n(y) / AVE[F_n(y)]$$
$$= 1 + \sum_{m=1}^{\infty} \gamma_m * \cos(m * \omega_o * y + \Phi_{mn}) \quad \cdots (18)$$

Fig.21B $$g_n(y) - 1 = \sum_{m=1}^{\infty} \gamma_m * \cos(m * \omega_o * y + \Phi_{mn})$$
$$= \sum_{m=1}^{\infty} |A_m| * \cos(m * \omega_o * y + \theta_m) \quad \cdots (19)$$

Fig.21C $$\gamma_m = 2 * |G_n(m)| / L \quad \cdots (20a)$$

$$\Phi_{mn} = \tan^{-1}\{Im[G_n(m)] / Re[G_n(m)]\} \quad \cdots (20b)$$

WHERE $Im[G_n(m)]$ : IMAGINARY PART
$Re[G_n(m)]$ : REAL PART

FLICKER REDUCTION METHOD, IMAGE PICKUP DEVICE, AND FLICKER REDUCTION CIRCUIT

TECHNICAL FIELD

The present invention relates to a method for reducing a fluorescent light flicker occurring in a video signal from an XY addressing type scanning image pickup element (an imager or an image sensor) such as a CMOS (complementary metal oxide semiconductor) image pickup element when a subject is photographed by the image pickup element under light of a fluorescent lamp, an image pickup device, such as a video camera or a digital still camera employing the XY addressing type scanning image pickup element such as the CMOS image pickup element, and a flicker reduction circuit for use in the image pickup device.

BACKGROUND ART

When a subject is photographed by a video camera under an illumination of a fluorescent lamp directly operated from commercial AC power, chronological brightness level variations in a video signal as an image output, i.e., a fluorescent light flicker occurs due to a difference between the frequency (twice the frequency of the commercial AC power) of a luminance change (light intensity change) of the fluorescent lamp and a vertical synchronization frequency of the camera.

For example, in a zone where the frequency of the commercial AC power is 50 Hz, a subject may be photographed by a CCD camera of an NTSC method (at a 60 Hz vertical synchronization frequency) under the illumination of the non-inverter fluorescent lamp. In such a case as shown in FIG. 28, one field frequency is 1/60 second while the period of the luminance change of the fluorescent lamp is 1/100 second. The exposure timing at each field drifts with respect to variations in the luminance of the fluorescent lamp, and an amount of exposure light at each pixel changes from field to field.

If the exposure time is 1/60 second, the amount of exposure light is different within the same exposure time from duration a1 to duration a2 to duration a3, and when the exposure time is shorter than 1/60 second (but not 1/100 second), the amount of exposure light time is different within the same exposure from duration b1 to duration b2 to duration b3.

Since the exposure timing responsive to the luminance change of the fluorescent lamp reverts back to the original timing every three fields, the brightness level variation due to flickering is repeated every three fields. More specifically, the luminance ratio of each field (the appearance of a flicker) changes within an exposure period, but the period of flickering remains unchanged.

In a progressive camera such as a digital camera, the brightness level variation is repeated every three frames if the vertical synchronization frequency is 30 Hz.

To emit white light, a plurality of fluorescent lamps, for example, a red fluorescent lamp, a green fluorescent lamp, and a blue fluorescent lamp are typically used. Fluorescent materials for these lamps have unique persistence characteristics thereof, and for a duration of time from a stop of discharging to a subsequent start of discharging, light emission decays in accordance with the persistence characteristics. During this duration of time, light appearing white at first decays while the hue thereof changes at the same time. If the exposure timing drifts, not only the brightness level variations but also the hue change occurs. Since the fluorescent lamp has unique spectral characteristics that a strong peak is present in a particular wavelength, a variable component of a signal becomes different from color to color.

The color hue change and the difference in the variable component from color to color lead to a so-called color flicker.

As shown in the bottom portion of FIG. 28, the amount of exposure light remains constant regardless of the exposure timing if the exposure time is set to be an integer multiple of periods (1/100 second) of the luminance variation of the fluorescent lamp. No flicker then occurs.

It is contemplated that illumination of the fluorescent lamp is detected through signal processing of a camera in response to an operation of a user, and that the exposure time is set to be an integer multiple of 1/100 second under the illumination of the fluorescent lamp. In this arrangement, a simple method can fully control the generation of the flickering.

However, since this method does not allow the exposure time to be set to any value, the freedom of the exposure amount adjustment means for obtaining an appropriate amount of exposure is reduced.

A method for reducing the fluorescent light flicker under any shutter speed (exposure time) is thus required.

An image pickup device having all pixels in one frame exposed at the same exposure timing, such as a CCD image pickup device, offers relatively easily such a method because the brightness level variations and color variations due to the flickering appears only between fields.

If the exposure time is not 1/100 second, the flickering has a repetition frequency of three fields as shown in FIG. 28. To achieve a constant average value of the video signal of each field, current luminance variations and current color variations are predicted from the video signal three fields before, and the gain of the video signal of each field is adjusted based on the prediction results so that the flicker is reduced to a level that presents no problem in practice.

In the XY addressing type scanning image pickup device, such as a CMOS image pickup device, however, the exposure timing drifts successively from pixel to pixel by one horizontal period of the reading clock (pixel clock) in a screen horizontal direction. Since all pixels are different in the exposure timing, the above-referenced method cannot suppress the flickering.

FIG. 29 illustrates such flickering. The pixels successively drift in the exposure timing in the screen horizontal direction as discussed above. One horizontal period is sufficiently shorter than the period of the variation of the fluorescent light. Based on the assumption that the pixels on the same line have the same timing, the exposure timing of each line in a screen vertical direction becomes something like the one shown in FIG. 29. This assumption presents no practical problem.

The exposure timing is different from line to line in the XY addressing type scanning image pickup device, such as a CMOS image pickup device as shown in FIG. 29 (F1 represents such a drift in the exposure timing). Since the lines suffer from a difference in the amount of exposure light, the brightness level variation and the color variation take place due to the flickering not only between fields but also within each field. A strip pattern appears on a screen (with strips thereof aligned in the horizontal direction and the density of the stripes changing in the vertical direction).

FIG. 30 illustrates an on-screen flicker if a subject is a uniform pattern. Since one horizontal period (one wavelength) of the subject is 1/100 second, a stripe pattern of 1.666 periods appears in one frame. Let M represent the number of read lines per field, and one horizontal period of the stripe pattern corresponds to the number of read lines L=M*60/100. In this description and the drawing, an asterisk (*) represents a multiplication operation.

As shown in FIG. 31, three fields (three frames) correspond to five periods (five wavelengths) of the stripe pattern, and if viewed continuously, the stripe pattern appears to drift in a vertical direction.

FIG. 30 and FIG. 31 show only the brightness level variation due to the flicker. In practice, however, the above-described color variation also additionally appears, thereby substantially degrading image quality. The color flicker, in particular, becomes pronounced as the shutter speed becomes fast. The XY addressing type scanning image pickup device suffers more from image quality degradation because the effect of the color flicker also appears on the screen.

If the exposure timing is set to be an integer multiple of periods (1/100 second) of the luminance variation of the fluorescent light, the amount of exposure becomes constant regardless of the exposure timing, and a fluorescent light flicker containing an on-screen flicker does not occur.

With a variable electronic shutter speed feature incorporated, a CMOS image pickup device becomes complex in structure. Even in an image pickup device having the electronic shutter, the flexibility of the exposure amount adjusting means for achieving an appropriate exposure is reduced if only an integer multiple of 1/100 second is set as the exposure time to prevent flickering.

Methods for reducing the fluorescent light flickering for use in the XY addressing type scanning image pickup device, such as the CMOS image pickup device, have been proposed.

Patent document 1 (Japanese Unexamined Patent Application Publication No. 2000-350102) and patent document 2 (Japanese Unexamined Patent Application Publication No. 2000-23040) discloses methods of estimating a flicker component by measuring an amount of light of a fluorescent lamp with a photosensitive element or a measuring element and controlling a gain of a video signal from an image pickup element in response to the estimation result.

Patent document 3 (Japanese Unexamined Patent Application Publication No. 2001-16508) discloses another technique. In accordance with the disclosed technique, two types of images are taken in two conditions, namely, a first electronic shutter value appropriate for a current ambient illumination condition and in a second electronic shutter value having a predetermined relationship to a light and dark cycle of a fluorescent lamp, a flicker component is estimated by comparing the two signals, and a gain of a video signal from an image pickup device is controlled in response to the estimation results.

Patent document 4 (Japanese Unexamined Patent Application Publication No. 11-164192) discloses another technique. In accordance with the disclosed technique, a brightness variation under an illumination of a fluorescent lamp is recorded beforehand as a correction factor in a memory, the phase of a flicker component is detected from a video signal from an image pickup device taking advantage of a difference between the frequency of a video signal component and the frequency of the flicker component, and the video signal is thus corrected in accordance with the correction factor in the memory in response to the detection results.

Patent document 5 (Japanese Unexamined Patent Application Publication No. 2000-165752) discloses another technique. In the disclosed technique, a correction coefficient is calculated from two video signals that are obtained as a result of exposures performed with a time difference, the time difference causing the phase of flicker to be inverted by 180 degrees.

As disclosed in patent documents 1 and 2, the technique of estimating of the flicker component by measuring the amount of light of the fluorescent lamp with the photosensitive element or the measuring element increases the size and the cost of the image pickup system because the photosensitive element or the measuring element is attached to the image pickup device.

As disclosed in patent document 3, the technique of estimating the flicker component by photographing the two types of images in the different shutter conditions (exposure conditions) requires a complex system in the image pickup device, and further this technique is not appropriate for taking a moving image.

The technique disclosed in patent document 4 uses the coefficient prepared beforehand in the memory as a correction signal. It is practically impossible to prepare the correction coefficients for all types of fluorescent lamps. Depending on the type of the fluorescent lamp, detecting accurately the flicker component and reducing reliably the flicker component are difficult. As disclosed in patent document 4, the technique of extracting the flicker component from the video signal taking advantage of the difference between the frequencies of the video signal component and the flicker component has difficulty in detecting the flicker component distinctly from the video signal component in a black background portion and a low-illuminance portion, each portion having a small amount of flicker component. If a moving image is present in a screen, performance for detecting the flicker component is substantially lowered.

As the technique disclosed in patent document 3, the technique disclosed in patent document 5 for estimating the flicker component by photographing the two types of images at the different timings requires a complex system in the image pickup device and is not appropriate for taking a moving image.

In accordance with the present invention, a fluorescent light flicker characteristic of an XY addressing type scanning image pickup device such as a CMOS image pickup device is accurately detected and reliably and sufficiently reduced through simple signal processing without using an photosensitive element regardless of the level of a video signal of a subject and the type of a fluorescent lamp.

DISCLOSURE OF INVENTION

A flicker reduction method of a first invention for reducing a fluorescent light flicker component in a video signal or a luminance signal obtained by photographing a subject through an XY addressing type image pickup element under an illumination of a fluorescent lamp, includes
    a step of integrating the video signal or the luminance signal, as an input image signal, throughout a duration of time equal to or longer than one horizontal period,
    a step of normalizing the integrated value or a difference value between the integrated values of adjacent fields or adjacent frames,
    a step of extracting a spectrum of the normalized integrated value or the normalized difference value,
    a step of estimating a flicker component from the extracted spectrum, and
    a step of performing a calculation operation on the estimated flicker component and the input image signal to cancel out the estimated flicker component.

A flicker reduction method of a second invention for reducing a fluorescent light flicker component in each of color signals of colors obtained by photographing a subject through an XY addressing type image pickup element under an illumination of a fluorescent lamp, includes
- a step of integrating the color signal of each color, as an input image signal, throughout a duration of time equal to or longer than one horizontal period,
- a step of normalizing the integrated value or a difference value between the integrated values of adjacent fields or adjacent frames,
- a step of extracting a spectrum of the normalized integrated value or the normalized difference value,
- a step of estimating a flicker component from the extracted spectrum, and
- a step of performing a calculation operation on the estimated flicker component and the input image signal to cancel out the estimated flicker component.

A flicker reduction method of a third invention for reducing a fluorescent light flicker component in each of a luminance signal and each of color signals of colors, obtained by photographing a subject through an XY addressing type image pickup element under an illumination of a fluorescent lamp, includes
- a step of integrating each of the luminance signal and the color signal of each color, as an input image signal, throughout a duration of time equal to or longer than one horizontal period,
- a step of normalizing the integrated value or a difference value between the integrated values of adjacent fields or adjacent frames,
- a step of extracting a spectrum of the normalized integrated value or the normalized difference value,
- a step of estimating a flicker component from the extracted spectrum, and
- a step of performing a calculation operation on the estimated flicker component and the input image signal to cancel out the estimated flicker component.

In accordance with the flicker reduction method of the present invention, a signal component other than a flicker component is removed as the normalized integrated value or the normalized difference value, and a signal that allows the flicker component to be easily estimated at a high precision is obtained from a black background portion and a low-illuminance portion, each portion having a small amount of flicker component. By extracting the spectrum to an appropriate order from the normalized integrated value and the normalized difference value, the flicker component is thus estimated at a high precision regardless of the type of a fluorescent lamp and a luminance varied waveform even in an area where a signal component becomes discontinuous by the effect of a subject. The flicker component is reliably and sufficiently reduced from the input image signal by performing the calculation operation on the estimated flicker component and the input image signal.

In particular, in accordance with the flicker component reduction method of the second or third invention, the flicker component is detected from the color signal of each color, obtained as the video signal, on a per color signal basis, or on a per luminance and color signal basis, and the detected flicker component is reduced. The fluorescent light flicker containing the color flicker is thus accurately detected and reliably and sufficiently reduced.

BRIEF DESCRIPTION OF THE DRAWINGS

FIG. 16 serves the purpose of explanation of FIG. 14 and FIG. 15.

FIGS. 17A and 17B illustrate equations serving the purpose of explanation of an example of adjusting the estimated flicker component.

FIGS. 18A and 18B illustrate equations serving the purpose of explanation of the example of adjusting the estimated flicker component.

FIGS. 19A and 19B illustrate equations serving the purpose of explanation of the example of adjusting the estimated flicker component.

FIGS. 20A-20E illustrate equations serving the purpose of explanation of the example of adjusting the estimated flicker component.

FIGS. 21A-21C illustrate equations serving the purpose of explanation of the example of adjusting the estimated flicker component.

BEST MODE FOR CARRYING OUT THE INVENTION

Figure 1:
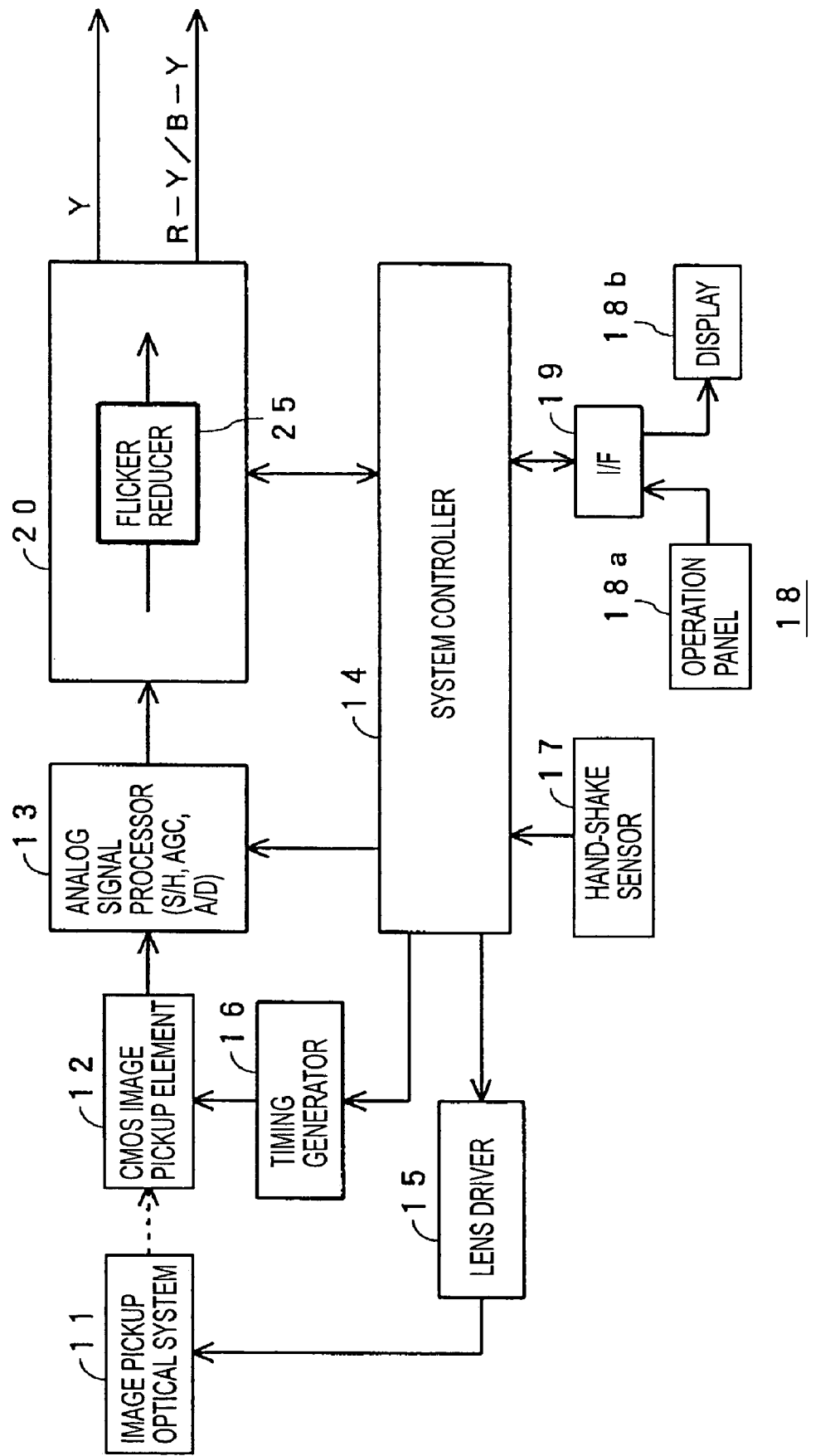
FIG. 1 illustrates a system configuration of an image pickup device of one embodiment of the present invention.
Figure 2:
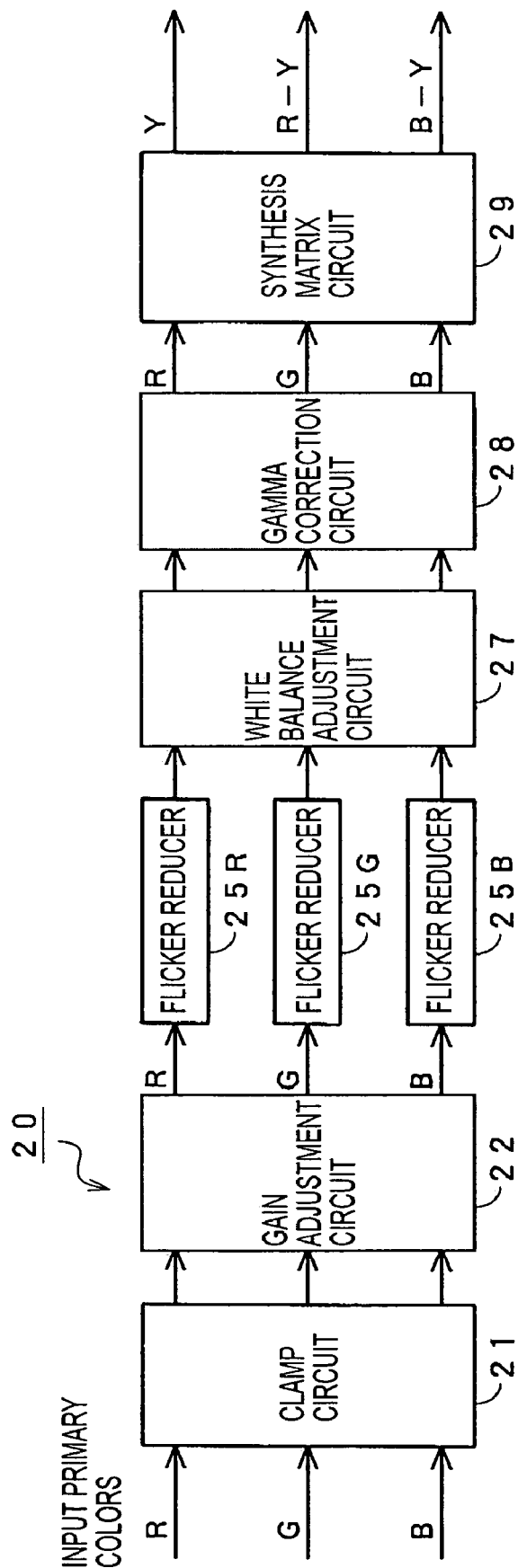
FIG. 2 illustrates one example of a digital signal processor of a primary color system.
Figure 3:
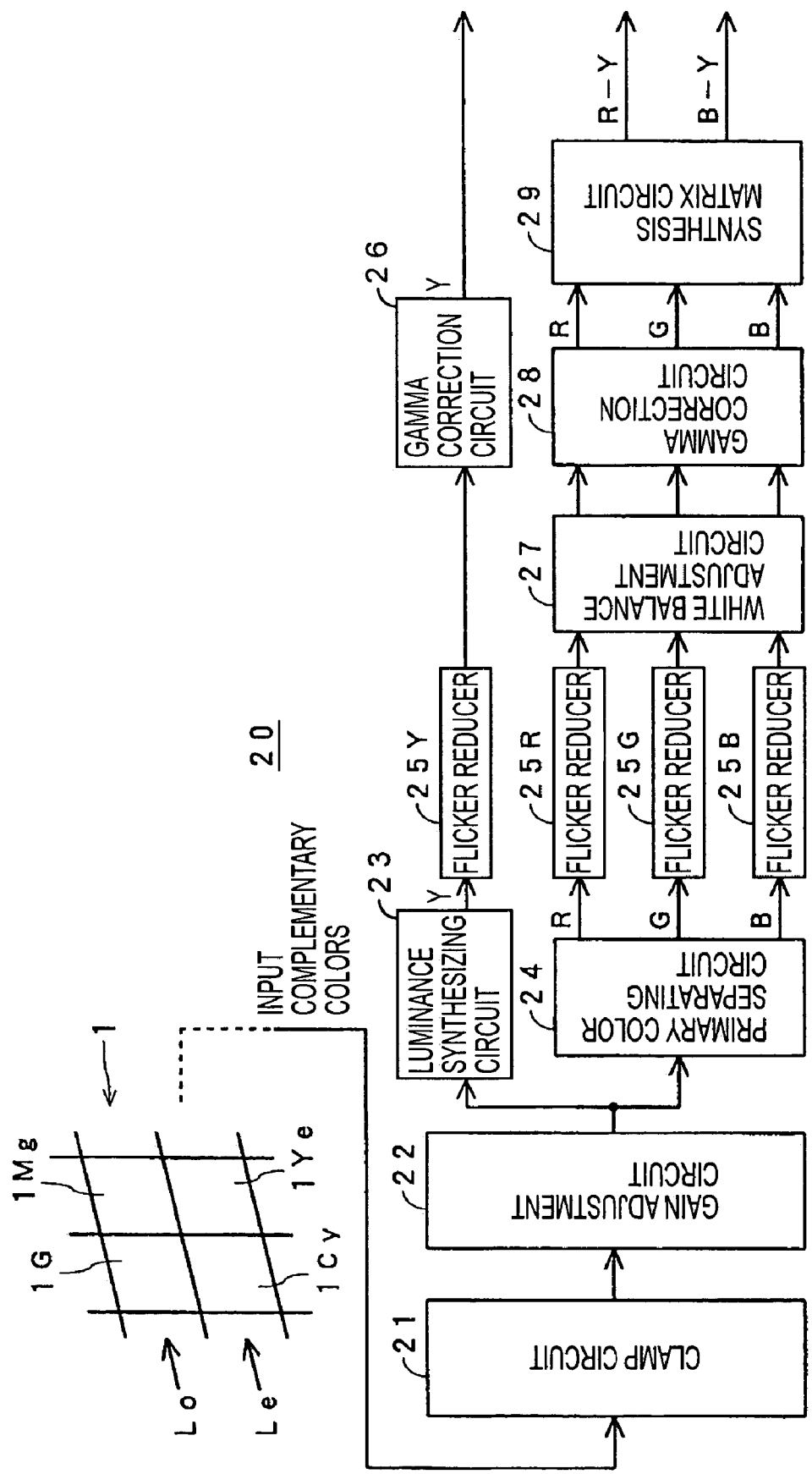
FIG. 3 illustrates one example of a digital signal processor of a complementary color system.

[Embodiments of Image Pickup Devices: FIG. 1-FIG. 3]
(System Configuration: FIG. 1)

FIG. 1 illustrates a system configuration of one embodiment of an image pickup device in accordance with the present invention. The image pickup device is here a video camera employing a CMOS image pickup element as a XY addressing type scanning image pickup -element.

In the image pickup device of this embodiment, namely, the video camera, light from a subject is incident on a CMOS image pickup device 12 via an image pickup optical system 11, and photoelectrically converted into an analog video signal by the CMOS image pickup device 12. The resulting analog video signal is thus obtained from the CMOS image pickup device 12.

The CMOS image pickup device 12 includes, on a CMOS substrate, a plurality of two-dimensionally arranged pixels, each pixel including a photodiode (a photo gate), a transfer gate (shutter transistor), a switching transistor (address transistor), an amplification transistor, a reset transistor (reset gate), etc., and further a vertical scanning circuit, a horizontal scanning circuit, and a video signal output circuit.

The CMOS image pickup device 12 may be a primary color system or a complementary color system, and the analog video signal output from the CMOS image pickup device 12 is an RGB primary color signal or a complementary color signal.

An analog signal processor 13 packaged in an IC (integrated circuit) processes the analog video signal from the CMOS image pickup device 12 on a per color signal basis, thereby sample-holding the analog video signal, gain controlling the analog video signal in an AGC (automatic gain control) process, and A/D converting the video signal into a digital signal.

The digital video signal from the analog signal processor 13 is processed by a digital signal processor 20 packaged in an IC, as will be discussed later. In the digital signal processor 20, a flicker reducer 25 reduces the digital video signal on a per signal component basis using a method of the present invention as will be discussed later. The digital video signal is finally converted into a luminance signal Y, and red and blue color difference signals R-Y and B-Y to be output from the digital signal processor 20.

A system controller 14, including a microcomputer, controls each block in the camera.

More specifically, a lens drive control signal is supplied from the system controller 14 to a lens driver 15 packaged in an IC, and the lens driver 15 drives lenses in an image pickup optical system 11.

The system controller 14 supplies a timing control signal to a timing generator 16. The timing generator 16 supplies a variety of timing signals to a CMOS image pickup element 12 to drive the CMOS image pickup element 12.

The system controller 14 receives detection signals for signal components from the digital signal processor 20. The analog signal processor 13 gain controls the color signal in response to an AGC signal from the system controller 14. Signal processing of the digital signal processor 20 is controlled by the system controller 14.

If a subject changes in a short period of time in response to an action of a photographer, the system controller 14 detects an output from a hand-shake sensor 17 connected to the system controller 14, and controls a flicker reducer 25 as will be discussed later.

A control panel 18a and a display 18b, forming an interface 18, are connected to the system controller 14 via an interface (I/F) 19 composed of a microcomputer. The system controller 14 detects a setting operation and a selection operation on the control panel 18a. The system controller 14 also displays a set status and a control statue of the camera on the display 18b.

If a subject changes greatly in a short period of time in response to a camera operation, such as a zoom operation, the system controller 14 detects the camera operation, and controls the flicker reducer 25 as will be discussed later.

If no flicker reduction process is required, the system controller 14 detects that no flicker reduction is required and controls the flicker reducer 25 as will be discussed later.

(Primary Color System: FIG. 2)

FIG. 2 illustrates an example of the digital signal processor 20 of a primary color system.

The primary color system is a three-panel system or a single panel system. The three-panel system includes the image pickup optical system 11 of FIG. 1 including a light separation system for separating light from a subject into the RGB primary colors, and a CMOS image pickup element as the CMOS image pickup element 12 for the RGB colors. The single-panel system includes, as the CMOS image pickup element 12, a CMOS image pickup element including RGB color filers periodically arranged on each pixel in a horizontal direction on the screen of a light input surface thereof. In this case, the RGB primary color signals are read from the CMOS image pickup element 12.

In the digital signal processor 20 of FIG. 1, a clamp circuit 21 clamps a black level of each of the RGB primary color signals to a predetermined level, a gain adjustment circuit 22 gain adjusts the clamped RGB primary color signals in accordance with an amount of exposure, and flicker reducers 25R, 25G, and 25B reduce flicker components in the gain adjusted RGB primary color signals in accordance with a method of the present invention.

In the digital signal processor 20 of FIG. 2, a white balance adjustment circuit 27 adjusts the flicker-reduced RGB primary color signals, a gamma correction circuit 28 corrects the white-balanced adjusted RGB primary color signals, and a synthesis matrix circuit 29 generates the luminance signal Y, and the color difference signals R-Y and B-Y from the gamma-corrected RGB primary color signals.

The primary color system generates the luminance signal Y after the processing of the RGB primary color signals is complete as shown in FIG. 2. Since the flicker component in the RGB primary color signals is reduced in the course of the process of the RGB primary color signals, the flicker component in each of the color components and the luminance signal is sufficiently reduced.

Although flicker reducers 25R, 25G, and 25B are preferably arranged as shown in FIG. 2, the present invention is not limited to this arrangement.

(Complementary color system: FIG. 3)

FIG. 3 illustrates one example of the digital signal processor 20 for a complementary color system.

The primary color system is a single-panel system that includes, as the CMOS image pickup element 12 of FIG. 1, a CMOS image pickup element having complementary color filters on a light input surface thereof. The complementary color filter, as shown as a color filter 1 in FIG. 3, a green color filter section 1G and a magenta color filter section 1Mg are alternately arranged on the pixels in a horizontal direction at one horizontal line position Lo at every two lines, and a cyan color filter section 1Cy and a yellow color filter 1Ye are alternately arranged on the pixels in a horizontal direction at the other horizontal line position Le at every two lines.

In this case, the CMOS image pickup element 12 synthesizes and reads video signals of two adjacent horizontal line positions. At each horizontal period, a color signal synthesized from the green color signal and the cyan color signal and a color signal synthesized from the magenta color signal and the yellow color signal are alternately obtained at every pixel clock from the CMOS image pickup element 12.

In the digital signal processor 20 of FIG. 3, a clamp circuit 21 clamps a black level of the complementary color signal to a predetermined level, a gain adjustment circuit 22 gain adjusts the clamped complementary color signal in response to an amount of exposure, a luminance synthesizing circuit 23 generates a luminance signal Y from the gain-adjusted complementary color signal, and a primary color separating circuit 24 separates the gain-adjusted complementary color signal into the RGB primary color signals.

In the digital signal processor 20 of FIG. 3, a flicker reducer 25Y reduces a flicker component in the luminance signal Y from the luminance synthesizing circuit 23, and the flicker reducers 25R, 25G, and 25B reduce flicker components in the RGB primary color signals from the primary color separating circuit 24 in accordance with a method of the present invention.

In the digital signal processor 20 of FIG. 3, a gamma correction circuit 26 corrects the gradation of the flicker-reduced luminance signal, thereby resulting in a luminance signal Y as an output, a white balance adjustment circuit 27 white-balance adjusts the flicker-reduced RGB primary color signals, a gamma correction circuit 28 adjusts the gradation of the white-balance adjusted RGB primary color signals, and a synthesis matrix circuit 29 generates the color difference signals R-Y and B-Y from the gamma-corrected RGB primary color signals.

In the primary color system, the luminance signal and the RGB primary color signals are generated in a relatively earlier phase of the process of the digital signal processor 20 as shown in FIG. 3. This is because the luminance signal is easily generated from the synthesized signal through a simple additive process. If the RGB primary color signals are generated from the synthesized signal through a difference process, and the luminance signal Y is generated from the RGB primary color signals, and an S/N ratio of the luminance signal is lowered.

If the luminance signal Y and the color signals are processed through separate lines, merely reducing the flicker component in each color signal is not sufficient in the reduction of the flicker component in the luminance signal. The flicker components in each color component and the luminance signal are sufficiently reduced by separately reducing the flicker component in the luminance signal as shown in FIG. 3.

The flicker reducers 25R, 25G, and 25B are preferably arranged as shown in FIG. 3, but the present invention is not limited to this arrangement.

[Embodiments of the Flicker Reduction Method: FIG. 4-FIG. 27]

The flicker reducers 25R, 25G, and 25B of FIG. 2, and the flicker reducers 25R, 25G, and 25B of FIG. 3 are constructed as discussed below. The flicker reducers 25R, 25G, and 25B are hereinafter collectively referred to as a flicker reducer 25.

In the following discussion, an input image signal refers to a RGB primary color signal or a luminance signal input to the flicker reducer 25 prior to a flicker reduction process, and an output image signal refers to a RGB primary color signal or a luminance signal, output from the flicker reducer 25, subsequent to the flicker reduction process.

Figure 29:
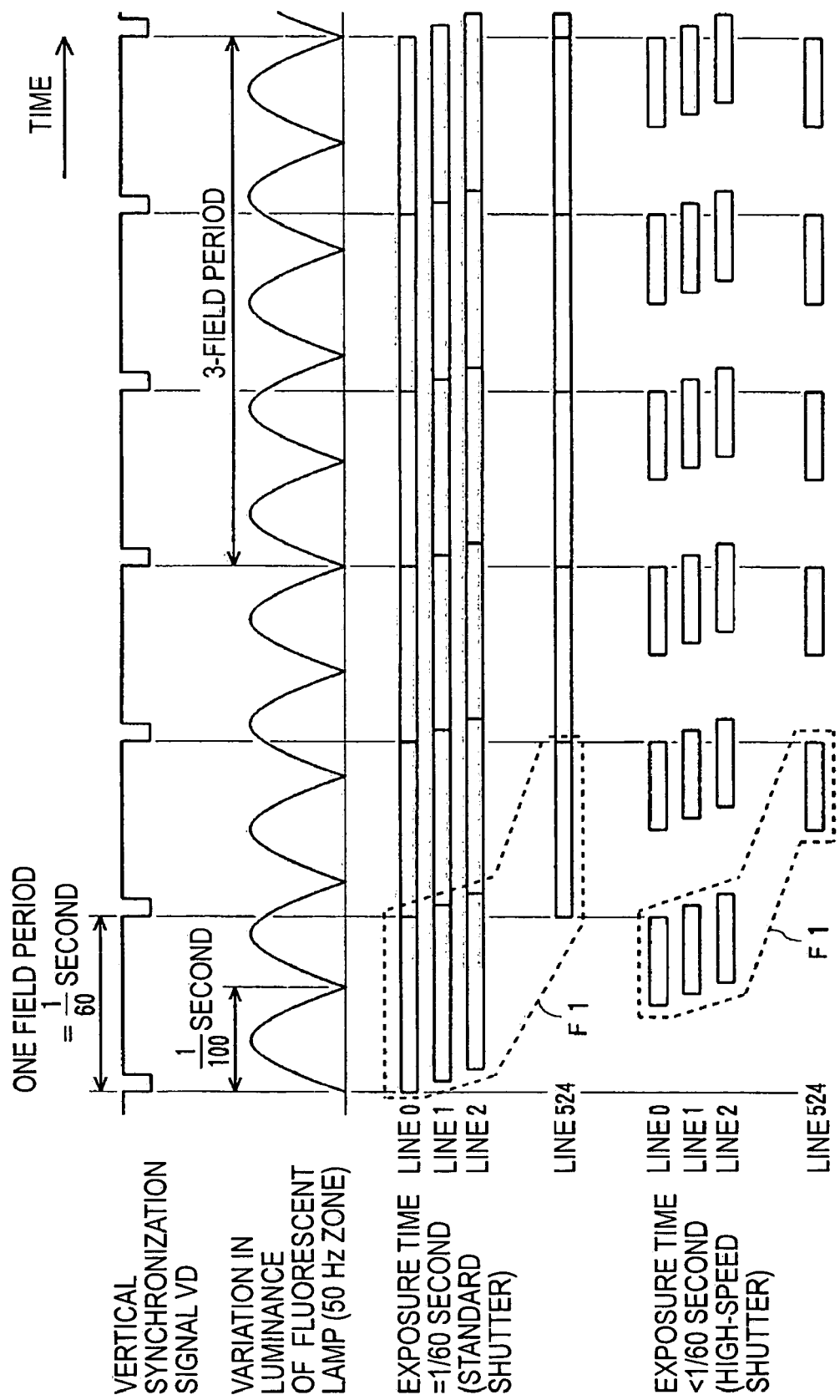
FIG. 29 illustrates a fluorescent light flicker in an XY addressing type image pickup element.
Figure 30:
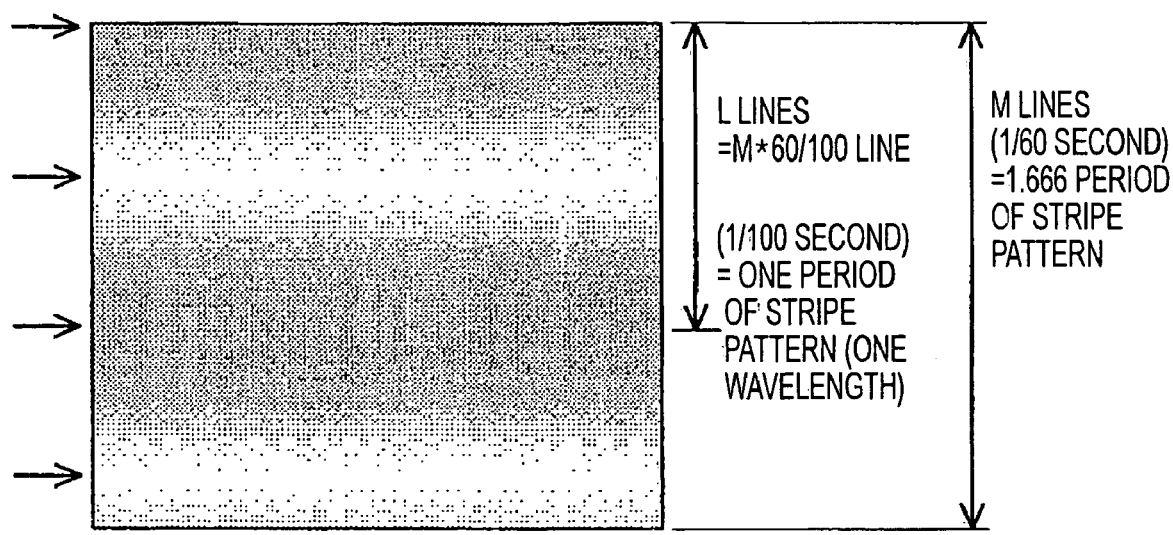
FIG. 30 illustrates a stripe pattern in one frame in the fluorescent light flicker in the XY addressing type image pickup element.
Figure 31:
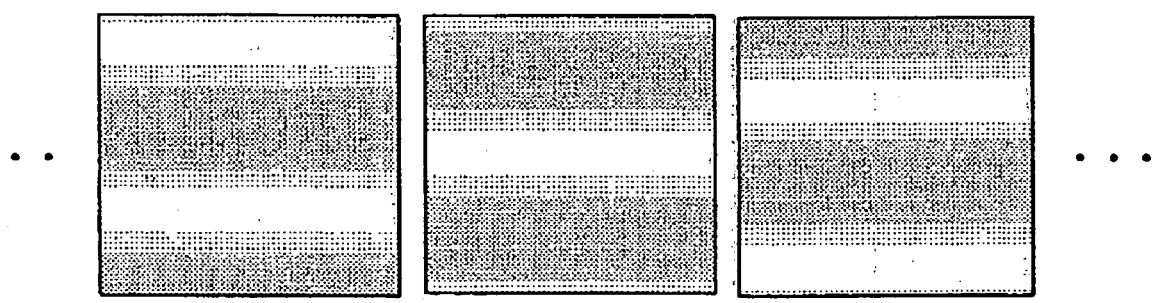
FIG. 31 illustrates a stripe pattern in three consecutive frames in the fluorescent light flicker in the XY addressing type image pickup element.

In the following discussion, a subject is photographed by a CMOS camera of an NTSC system (with a vertical synchronization frequency of 60 Hz) under an illumination of a fluorescent lamp operating from a commercial AC power source of 50 Hz. When the fluorescent light flicker is not reduced, the brightness level variations and the color variations take place not only between fields but also within each field and a strip pattern of five periods (five wavelengths) appears over three fields (three wavelengths) on a screen as shown in FIGS. 29-31.

In a non-inverter fluorescent lamp as well as an inverter fluorescent lamp, flickering takes place if rectification is not sufficient. The present invention is thus not limited to the non-inverter type.

Figure 4:
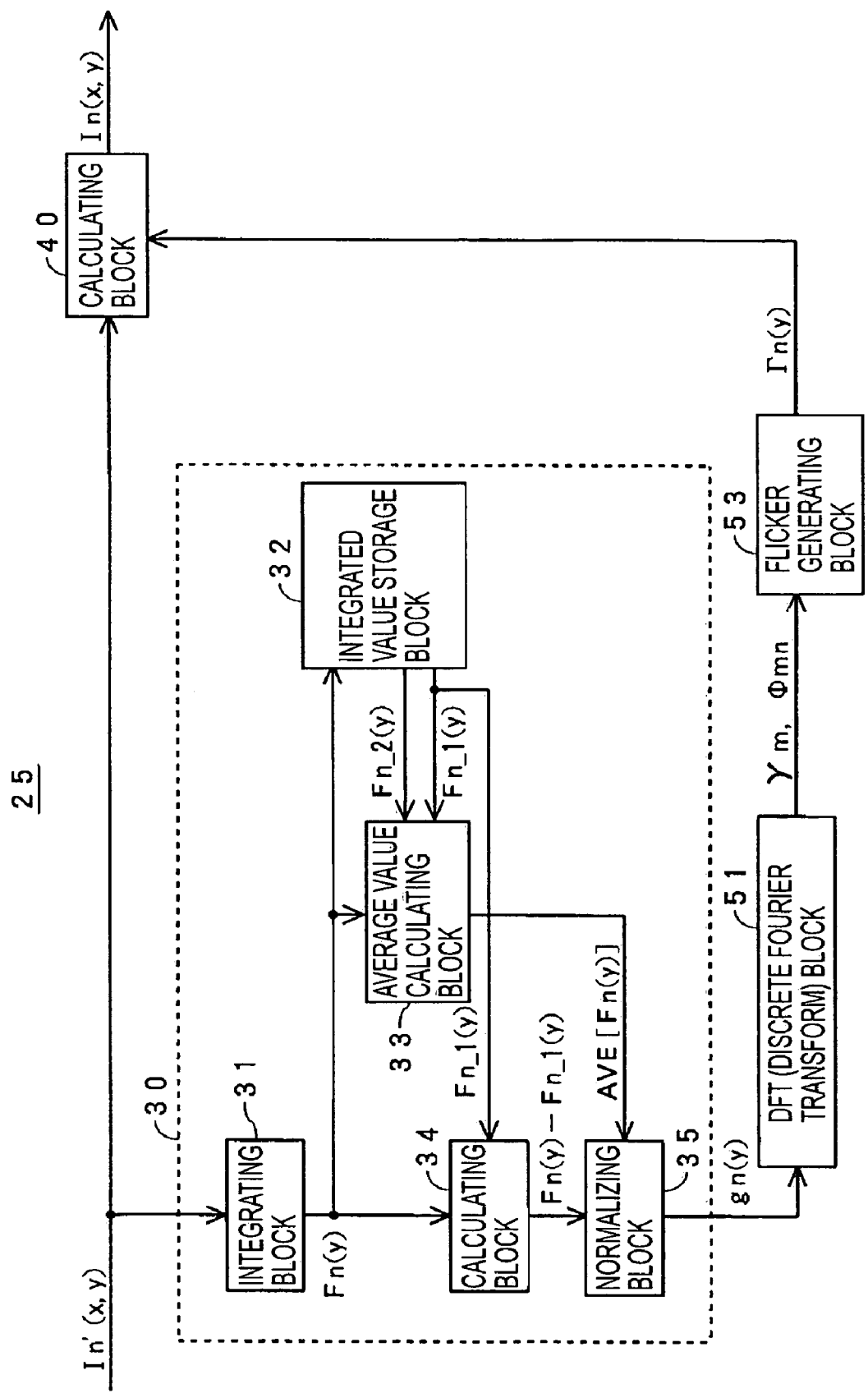
FIG. 4 illustrates a first example of a flicker reducer.

(First Example of the Flicker Reduction Method: FIG. 4)

FIG. 4 illustrates a first example of the flicker reducer 25.

As shown in FIGS. 30 and 31, the subject is uniform. The flicker component is typically proportional to a signal intensity of the subject.

Let $In'(x,y)$ represent an input image signal (an RGB primary color signal or a luminance signal prior to the flicker reduction process) of a subject at any pixel $n(x,y)$ in any field $n$, and $In'(x,y)$ is a sum of a signal component free from the flicker component and the flicker component proportional to the signal component as represented in equation (1) in FIG. 17A.

$In(x,y)$ represents the signal component, $\Gamma n(y)*In(x,y)$ represents the flicker component, and $\Gamma n(y)$ represents a flicker coefficient. One horizontal period is sufficiently shorter than a light emission period ($1/100$ second) of a fluorescent lamp, and the flicker coefficient is considered as being constant on the same line in the same field, and the flicker coefficient is thus represented by $\Gamma n(y)$.

As represented by equation (2) in FIG. 17A, $\Gamma n(y)$ is expressed by Fourier series for generalization. In this way, the flicker coefficient is expressed in a form that accounts for all of emission characteristics and persistence characteristics, different from type to type of fluorescent lamp.

In equation (2), $\lambda o$ represents the wavelength of the on-screen flicker shown in FIG. 30. Let M represent the number of read lines per field, and $\lambda o$ is L (=M*60/100) lines. Here, $\omega o$ represents a normalization angular frequency normalized by $\lambda o$.

Here, $\gamma m$ represents an amplitude of the flicker component of each order (m=1, 2, 3, . . . ). $\Phi mn$ represents an initial phase of the flicker component of each order, and is determined by the light emission period ($1/100$ second) and the exposure timing of the fluorescent lamp. Since $\Phi mn$ reverts back to the same value every three fields, and a difference of $\Phi mn$ to the immediately preceding field is determined by equation (3) in FIG. 17A.

<Calculation and Storage of Integrated Value>

In the example of FIG. 4, an integrating block 31 integrates the input image signal $In'(x,y)$ over one line in a horizontal direction on the screen as shown in equation (4) of FIG. 17B to minimize the effect of a picture in the detection of a flicker. An integrated value $Fn(y)$ is thus calculated. As represented by equation (5) of FIG. 17B, $\alpha n(y)$ in equation (4) represents a value that is obtained by integrating a signal component $In(x,y)$ over one line.

The integrated value $Fn(y)$ thus calculated is stored in an integrated value storage block 32 to detect flickering in subsequent fields. The integrated value storage block 32 is designed to store the integrated values of at least two fields.

If a subject is uniform, the integrated value αn(y) of the signal component In(x,y) becomes constant. It is thus easy to extract a flicker component αn(y)*Γn(y) from the integrated value Fn(y) of the input image signal In'(x,y).

In a general subject, however, αn(y) contains m*ωo component, and it is impossible to separate a luminance signal and a color component, as a flicker component, from a luminance signal and a color component as a signal component of the subject itself. It is impossible to extract only the flicker component. The flicker component in a second term is significantly smaller than the signal component in a first term in equation (4), and the flicker component is almost buried in the signal component.

Figure 23:
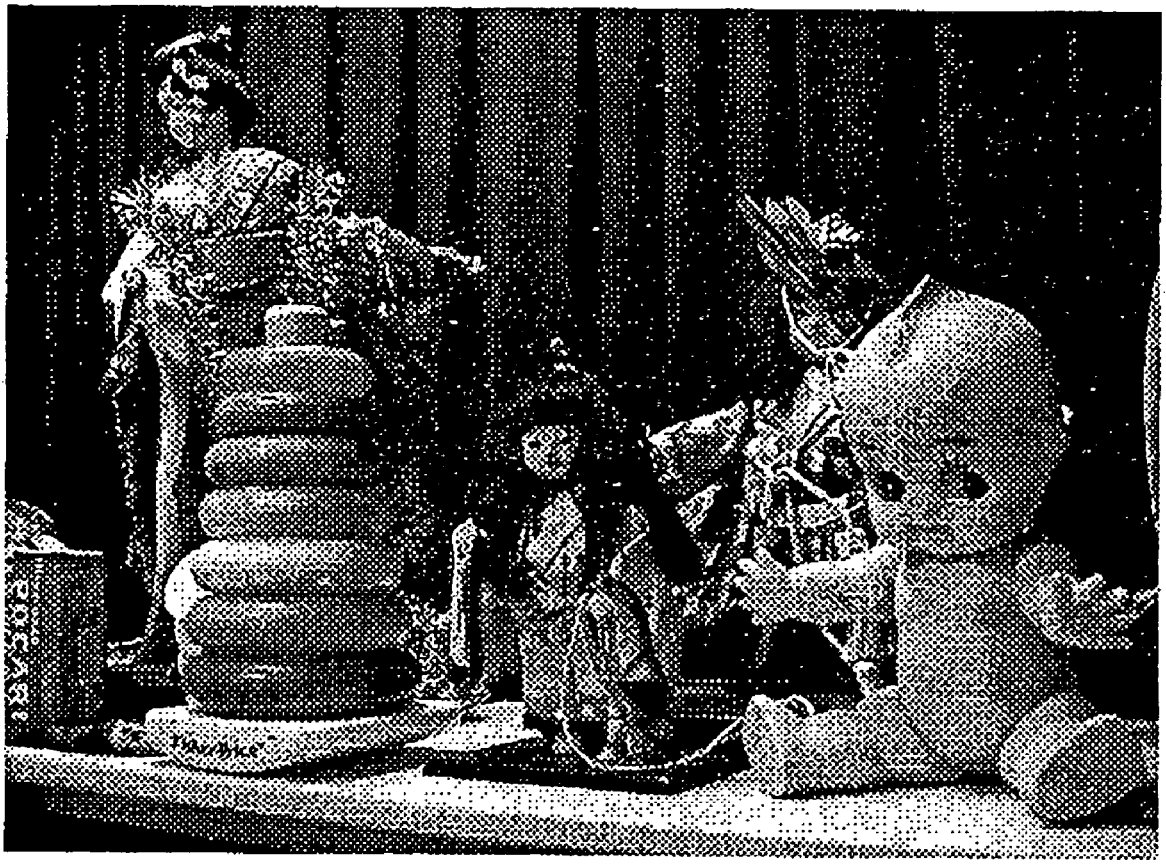
FIG. 23 illustrates a subject used in tests.
Figure 24:
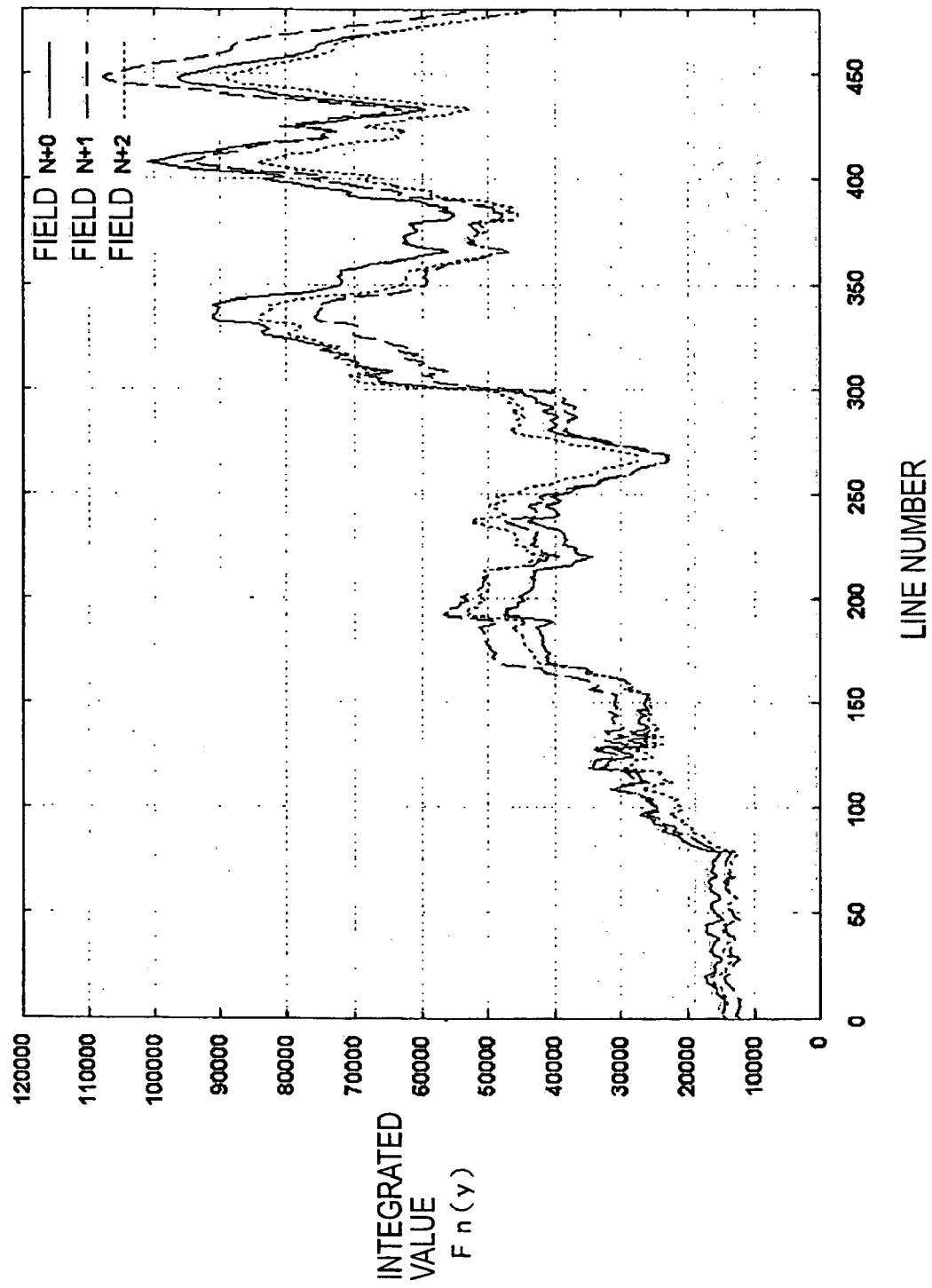
FIG. 24 is a plot of an integrated value of the subject of FIG. 23.

FIG. 24 illustrates the integrated value Fn(y) in three consecutive fields of a subject (a color subject in practice) of FIG. 23 for reference. FIG. 24 is a plot of the integrated value Fn(y) of a red color, and Field: N+0 (solid line), Field: N+1 (dash line), and Field: N+2 (broken line) represent first, second, and third fields appearing consecutively. As seen from FIG. 24, it is impossible to extract the flicker component directly from the integrated value Fn(y).

<Average Value Calculation and Difference Calculation>

As shown in FIG. 4, the integrated values of the three consecutive fields is used to remove the effect of αn(y) from the integrated value Fn(y).

In this example, during the calculation of the integrated value Fn(y), an integrated value Fn_1(y) on the same line in the first preceding field immediately prior to the current field and an integrated value Fn_2(y) on the same line in the second preceding field immediately prior to the first preceding field are read from the integrated value storage block 32. A average value calculating block 33 calculates an average value AVE [Fn(y)] of the three integrated value Fn(y), Fn_1(y), and Fn_2(y).

If the subject is identified as the same entity during the three consecutive fields, αn(y) may be assumed to have the same value. If the motion of the subject is small enough during the three consecutive fields, this assumption presents no problem in practice. In the calculation of the average of the integrated value during the three consecutive fields, equation (3) means that signals with the phases of the flicker components thereof successively shifted by (−2π/3)*m are summed. As a result, the flicker components cancel out each other. The average value AVE[Fn(y)] is expressed by equation (6) of FIG. 18A.

The average value of the integrated values for the three consecutive fields is calculated based on the assumption that the approximation of equation (7) of FIG. 18A holds. If the motion of the subject is large, the approximation of equation (7) does not hold.

In the flicker reducer 25 intended to work with a subject moving in a large amount, the integrated value storage block 32 stores the integrated values over at least three fields, and the average value of the integrated values of at least four fields including the integrated value Fn(y) of the current field. In this way, the operation of low-pass filters functioning in time axis reduces the effect of the moving subject.

However, the flicker is repeated every three fields. To cancel out the flicker component, the average value of the integrated values of j (an integer multiple of 3, equal to or greater than twice 3, namely, 6, 9, . . . ) fields needs to be calculated. The integrated value storage block 32 is thus designed to store the integrated values of at least (j−1) fields.

FIG. 4 illustrates a case in which the approximation of equation (7) of FIG. 18A holds. Furthermore in this example, a difference calculating block 34 calculates a difference between the integrated value Fn(y) of the current field from the integrating block 31 and the integrated value Fn_1(y) of the field immediately prior to the current field from the integrated value storage block 32. The difference value Fn(y)−Fn_1(y) represented by equation (8) of FIG. 18B is thus calculated. Equation (8) also holds on condition that the approximation of equation (7) holds.

Figure 25:
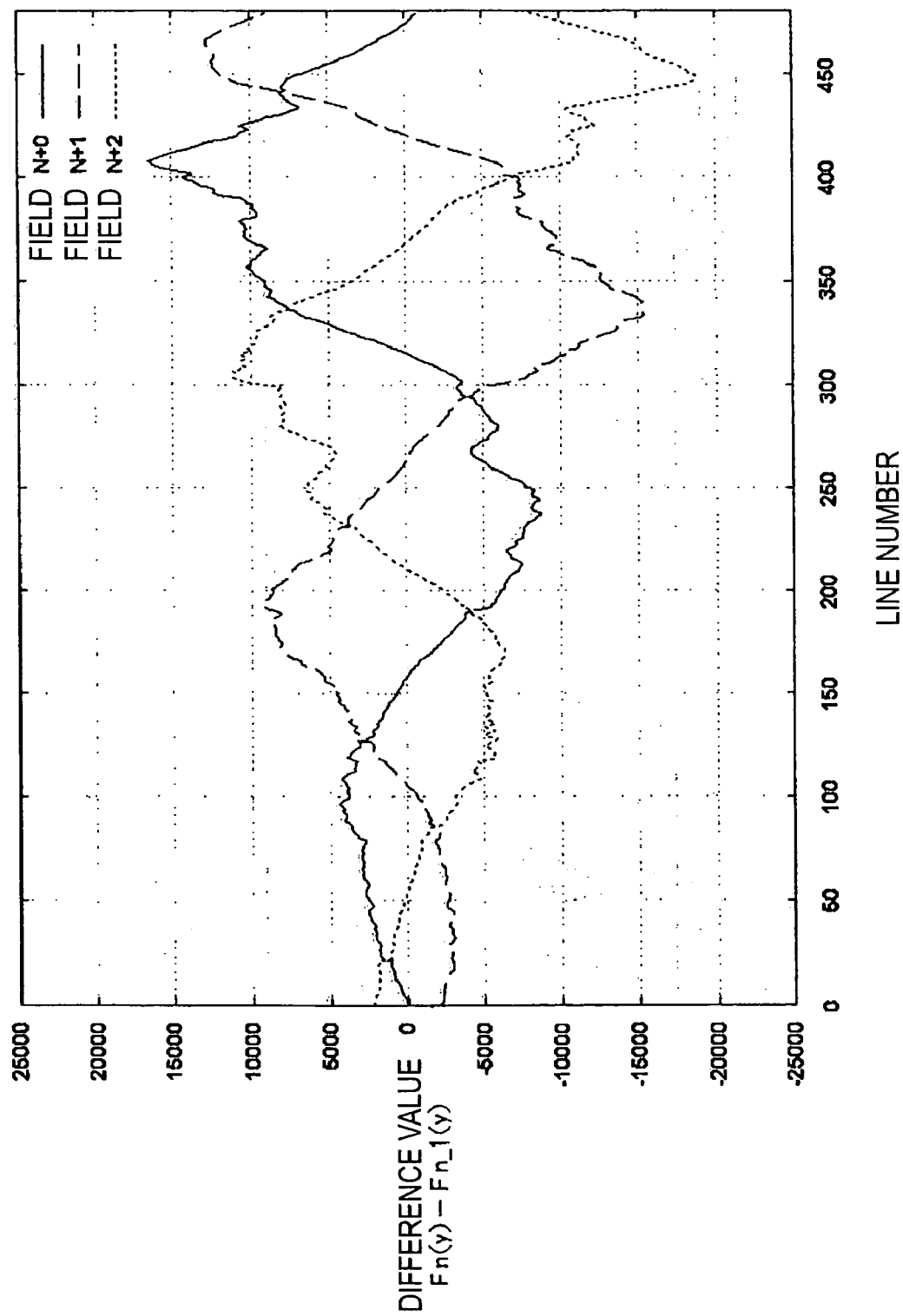
FIG. 25 is a plot of a difference value of the subject of FIG. 23.

FIG. 25 illustrates the difference value Fn(y)−Fn_1(y) of the three consecutive fields of the subject of FIG. 23. Since the effect of the subject is sufficiently removed from the difference value Fn(y)−Fn_1(y), the state of the flicker component (flicker coefficient) more distinctly appears than in the integrated value Fn(y) of FIG. 24.

<Normalization of Difference Value>

Furthermore in the example of FIG. 4, the normalizing block 35 normalizes the difference value Fn(y)−Fn_1(y) from the difference calculating block 34 by dividing the difference value Fn(y)−Fn_1(y) by the average value AVE[Fn(y)] from the average value calculating block 33, thereby outputting the normalized difference value gn(y).

The normalized difference value gn(y) is expanded as represented by equation (9) of FIG. 19A using equation (6) of FIG. 18A and equation (8) of FIG. 18B and the sum-to-product formula of trigonometry. The normalized difference value gn(y) is also expressed by equation (10) of FIG. 19B using the relationship of equation (3) of FIG. 17A. Here, |Am| and θm in equation (10) are respectively represented by equations (11a) and (11b).

Since the effect of the signal intensity of the subject still persists in the difference value Fn(y)−Fn_1(y), the levels of luminance variations and color variations due to the flickering are different from area to area. By normalizing the difference value gn(y) as described above, levels of the luminance variations and the color variations due to the flickering are set to be consistent to the same level.

Figure 26:
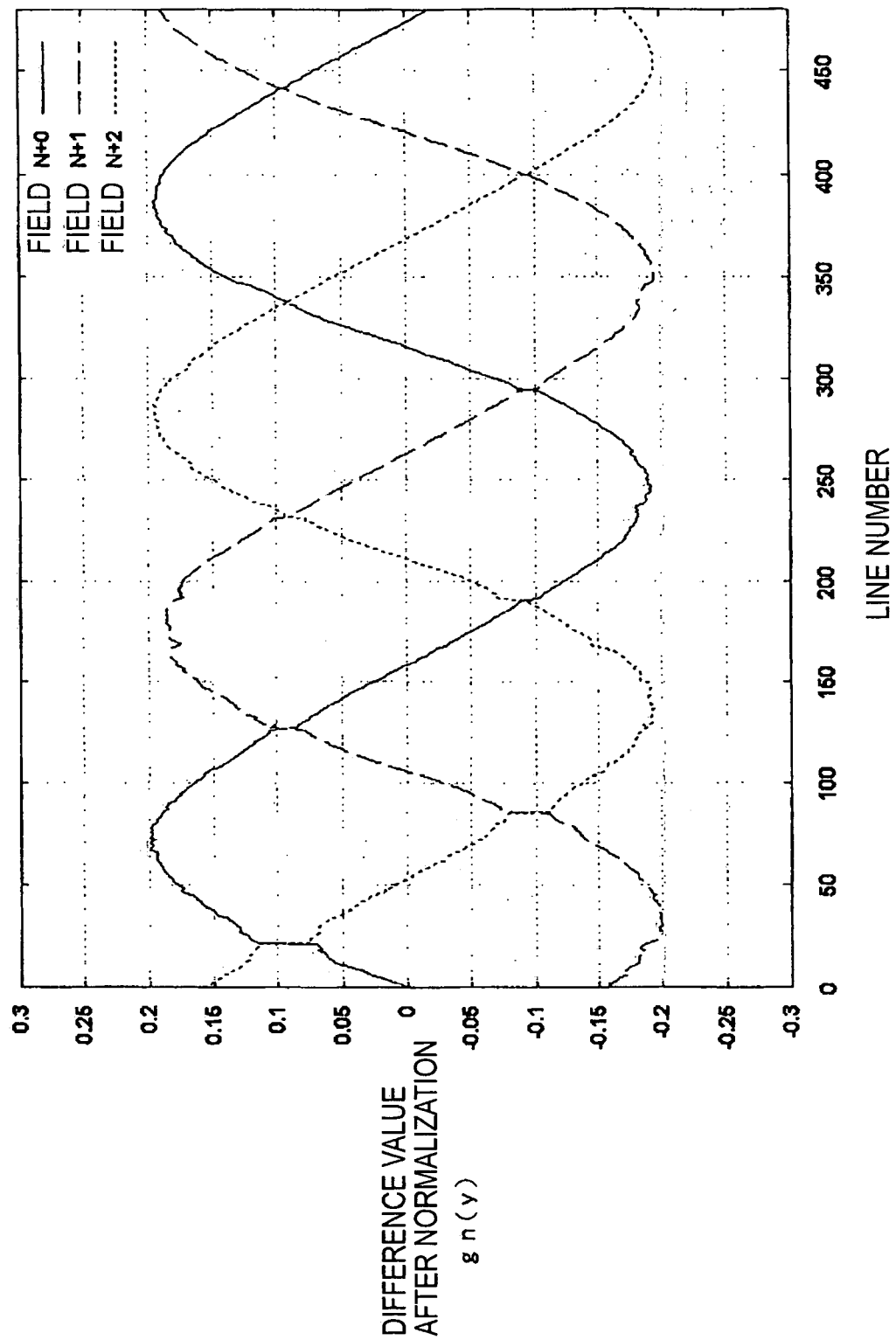
FIG. 26 is a plot of a normalized difference value of the subject of FIG. 23.

FIG. 26 illustrates the normalized difference value gn(y) of the three consecutive fields of the subject of FIG. 23.

<Estimation of the Flicker Component through Spectrum Extraction>

|Am| and θm respectively represented by equations (11a) and (11b) of FIG. 19B are an amplitude and an initial phase of the spectrum of each order of the normalized difference value gn(y). The normalized difference value gn(y) is Fourier transformed to determine the amplitude |Am| and the initial phase θm of the spectrum of each order. Equations (12a) and (12b) of FIG. 20A show that an amplitude γm and an initial phase Φmn of the flicker component of each order represented by equation (2) of FIG. 17A are thus obtained.

In the example of FIG. 4, a DFT block 51 discrete Fourier transforms data of one wavelength (of L lines) of flickering of the normalized difference value gn(y) from the normalizing block 35.

Let DFT[gn(y)] represent a DFT operation, and Gn(m) represent the DFT result of order m, and the DFT operation is expressed by equation (13) of FIG. 20B. Here, W in equation (13) is represented by equation (14). According to the definition of the DFT, the relationship between equations (11a) and (11b) and equation (13) is represented by equations (15a) and (15b) of FIG. 20C.

The amplitude γm and the initial phase Φmn of the flicker of each order are thus determined from equations (12a), (12b), (15a), and (15b) with reference to equations (16a) and (16b) of FIG. 20D.

The data length of the DFT operation is set to the one wavelength (of L lines) of the flicker because a discrete spectrum group of an integer multiple of ωo can be directly obtained.

The FFT (Fast Fourier Transform) is typically used as a Fourier transform for digital signal processing. However, the DFT is intentionally used in this embodiment of the present invention. The DFT is more convenient than the FFT because the data length of the Fourier transform is not a power of 2. Alternatively, the FFT can also be used by manipulating input data and output data.

The flicker component is sufficiently approximated under the illumination of an actual fluorescent lamp even if the order number is limited to m-th order. It is not necessary to output all data in the DFT operation. In comparison with the FFT, the DFT suffers from any particular drawback in terms of operation efficiency in the application of this invention.

The DFT block 51 extracts the spectrum through the DFT operation defined by equation (13), and then estimates the amplitude $\gamma m$ and the initial phase $\Phi mn$ of the flicker component of each order through an operation represented by equations (16a) and (16b).

In the example of FIG. 4, a flicker generating block 53 calculates a flicker coefficient $\Gamma n(y)$ represented by equation (2) of FIG. 17A from the estimated values $\gamma m$ and $\Phi mn$ from the DFT block 51.

As previously discussed, the flicker component is sufficiently approximated under the illumination of the light of the fluorescent lamp even if the order number is limited to the m-th order. In the calculation of the flicker coefficient $\Gamma n(y)$ through equation (2), the order of total sum is set to a predetermined order, such as a second order, rather than infinity.

Figure 27:
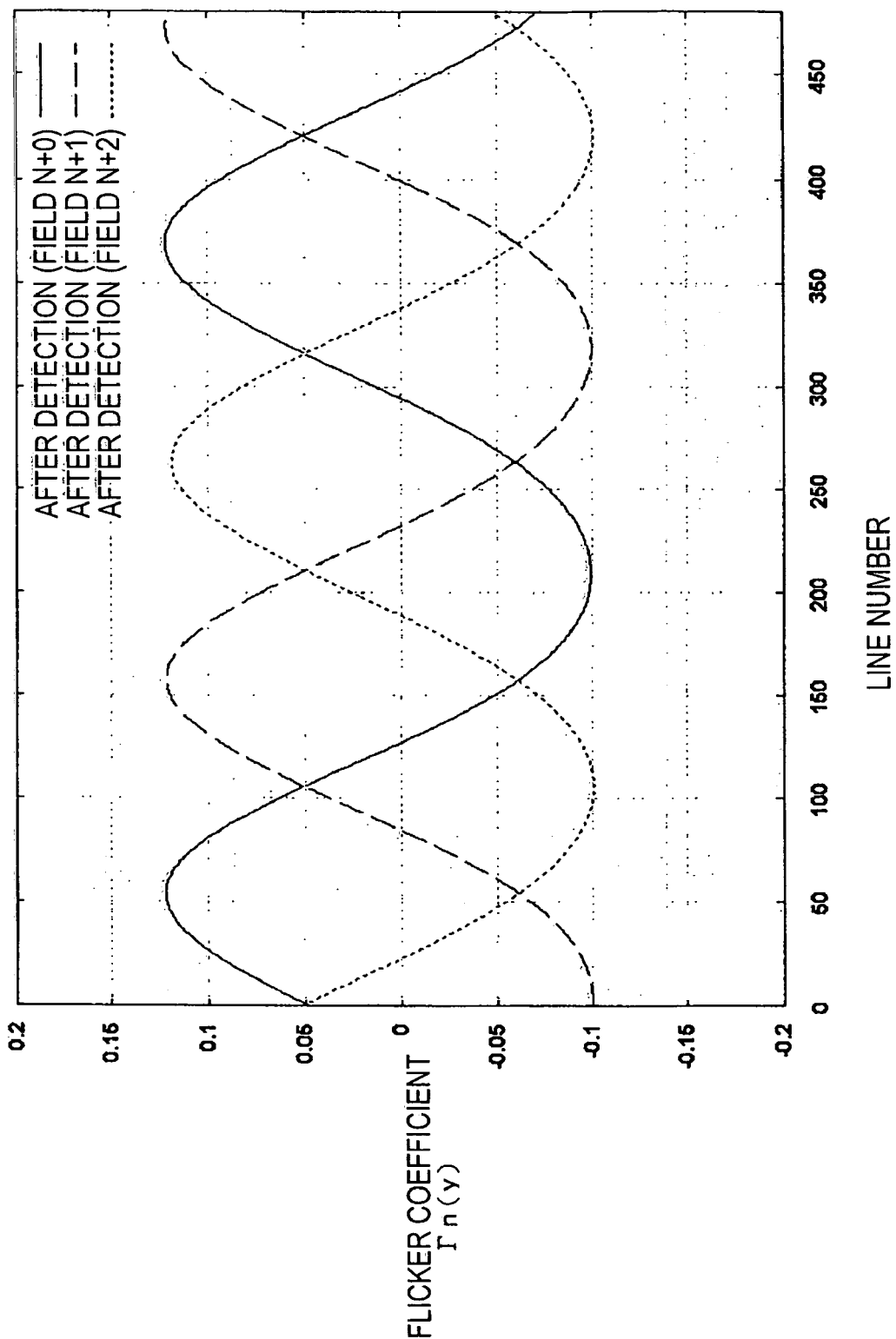
FIG. 27 is a plot of a flicker coefficient estimated for the subject of FIG. 23.
Figure 28:
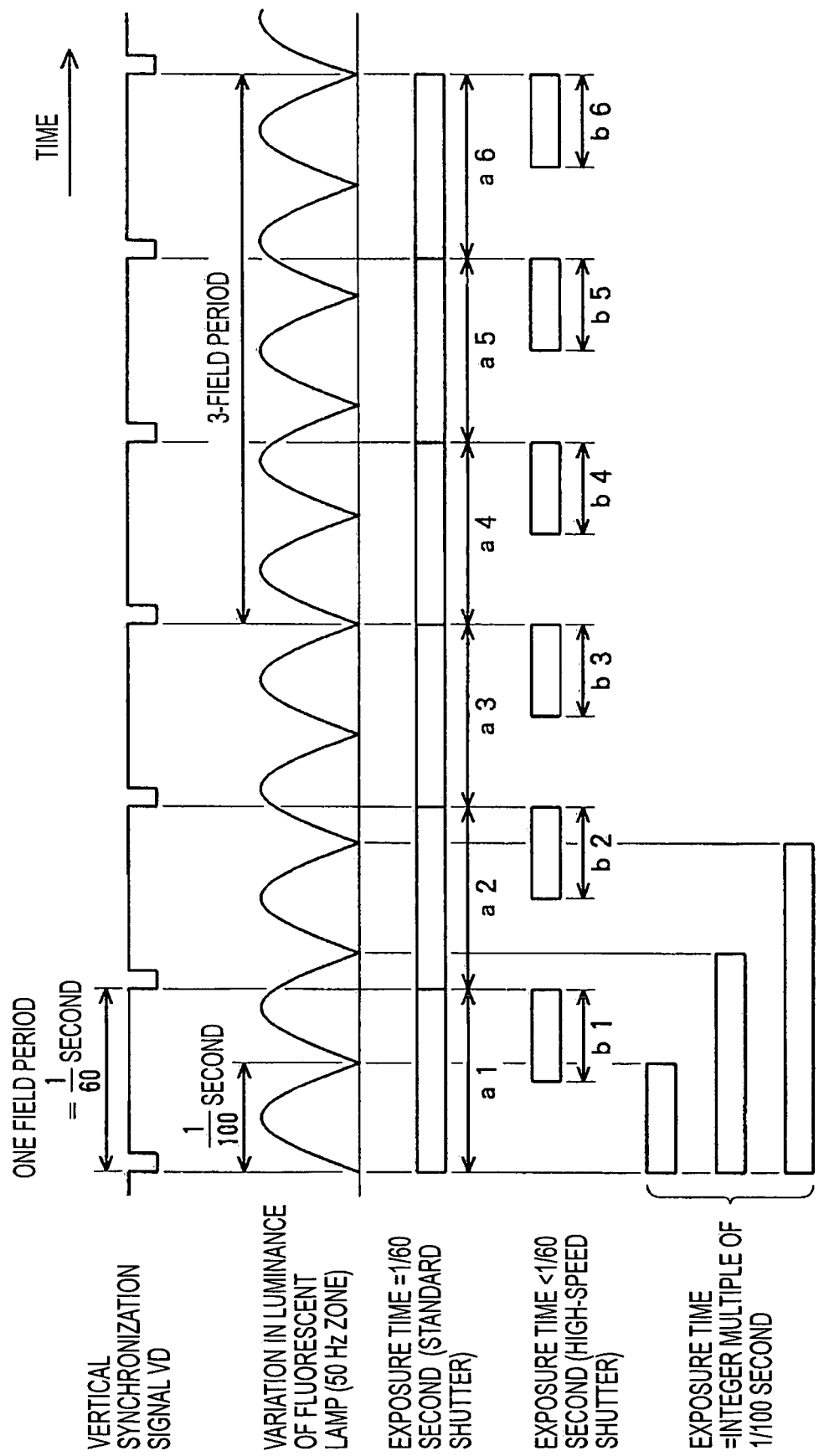
FIG. 28 illustrates a fluorescent light flicker of a CCD image pickup device.

FIG. 27 illustrates the flicker coefficient $\Gamma n(y)$ of the three consecutive fields of the subject of FIG. 23.

In the preceding method, the difference value $Fn(y)-Fn\_1(y)$ is calculated and then normalized by the average value $AVE[Fn(y)]$ in a black background portion and a low-illuminance portion, where the flicker component is typically small and is entirely buried in the signal component in the integrated value $Fn(y)$. The flicker component is thus accurately detected.

The estimation of the flicker component from the spectrum to an appropriate order means that the approximation is effected with the normalized difference value $gn(y)$ incompletely reproduced. Even if a discontinuity takes place in the normalized difference value $gn(y)$, as a result of an incomplete reproduction, depending on the state of the subject, the flicker component of that portion is accurately estimated.

<Calculation for Flicker Reduction>

From equation (1) of FIG. 17A, the signal component $In(x,y)$ having no flicker component is expressed in equation (17) of FIG. 20E.

In the example of FIG. 4, a calculating block 40 adds 1 to the flicker coefficient $\Gamma n(y)$ from the flicker generating block 53, and the input image signal $In'(x,y)$ is divided by the resulting sum $[1+\Gamma n(y)]$.

The flicker component contained in the input image signal $In'(x,y)$ is almost entirely removed in this way. The calculating block 40 results in a signal component $In(x,y)$ having no substantial flicker component as an output image signal (as the RGB primary color signal or the luminance signal subsequent to flicker reduction).

If all above processes are not completed within the duration of time of one field due to constraints on calculation performance of the system, a function of storing the flicker coefficient $\Gamma n(y)$ over the three fields is provided in the calculating block 40 taking advantage of the repetition of the flickering every three fields. The stored flicker coefficient $\Gamma n(y)$ is calculated for the input image signal $In'(x,y)$ subsequent to the three fields.

Figure 5:
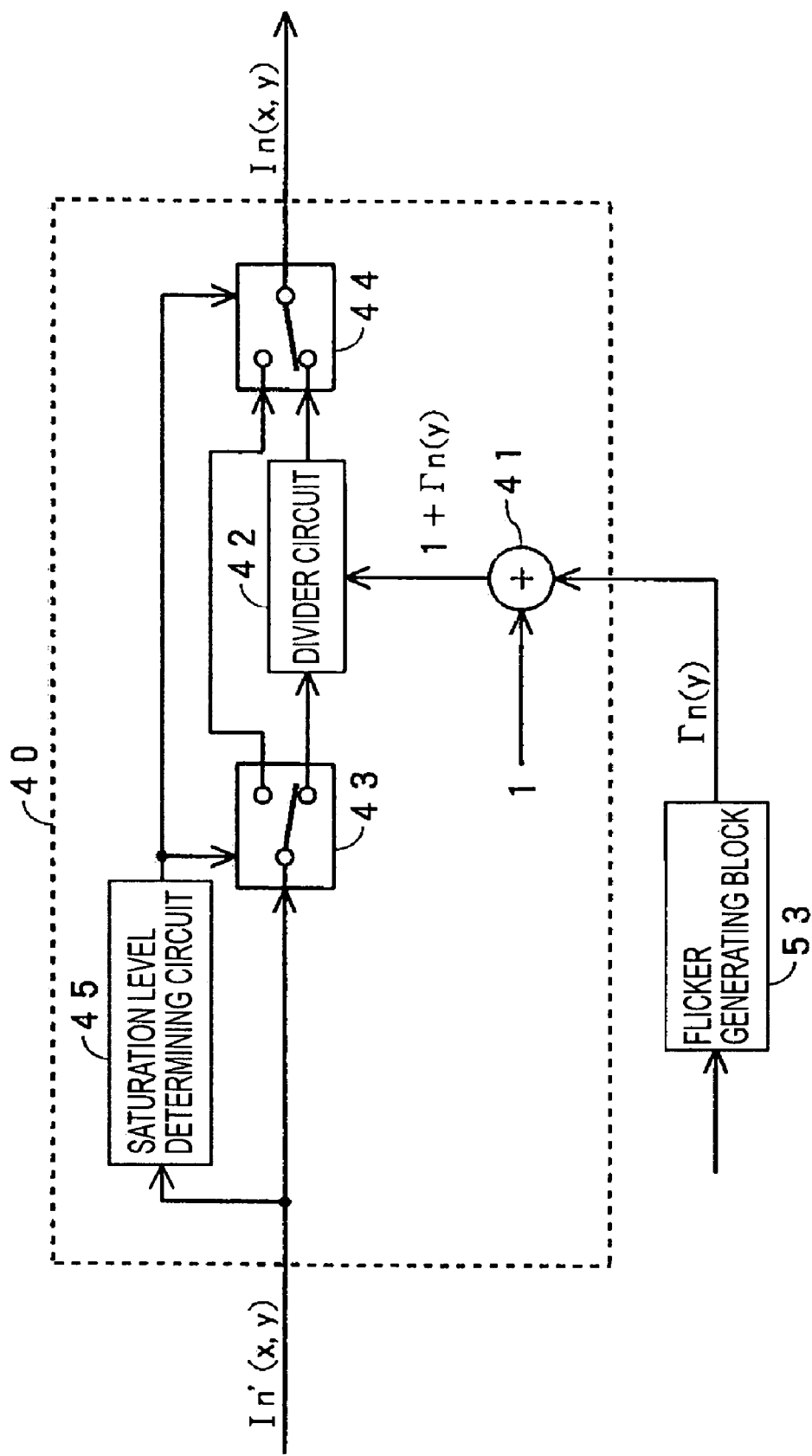
FIG. 5 illustrates one example of a calculating block taking into a saturation region.

(Example Accounting for Saturation Region: FIG. 5)

If the calculating block 40 of FIG. 4 performs the calculation represented by equation (17) with the level of the input image signal $In'(x,y)$ falling within a saturation region, the signal component (a color component or a luminance component) varies against the object of the invention. For this reason, the calculating block 40 preferably has a structure of FIG. 5.

The calculating block 40 of FIG. 5 includes an adder circuit 41 for adding 1 to the flicker coefficient $\Gamma n(y)$ from the flicker generating block 53, a divider circuit 42 for dividing the input image signal $In'(x,y)$ by the sum $[1+\Gamma n(y)]$, a switch 43 on the input side, a switch 44 on the output side, and a saturation level determining circuit 45. The saturation level determining circuit 45 determines on a per pixel basis whether the level of the input image signal $In'(x,y)$ is not lower than a threshold level of the saturation region.

If it is determined that the level of the input image signal $In'(x,y)$ is lower than the threshold level of the saturation region on each pixel, the saturation level determining circuit 45 sets the switches 43 and 44 to the sides thereof to the divider circuit 42. As previously discussed, the result of the calculation of equation (17) is output from the calculating block 40 as an output image signal.

If it is determined that the level of the input image signal $In'(x,y)$ is not lower than the threshold level of the saturation region on the pixel, the saturation level determining circuit 45 sets the switches 43 and 44 to the sides thereof opposite from the divider circuit 42. The input image signal $In'(x,y)$ is output as is as an output signal from the calculating block 40.

When the level of the input image signal $In'(x,y)$ falls within the saturation region, the signal component (the color component or the luminance component) is free from variations, and a high-quality image signal results.

Figure 6:
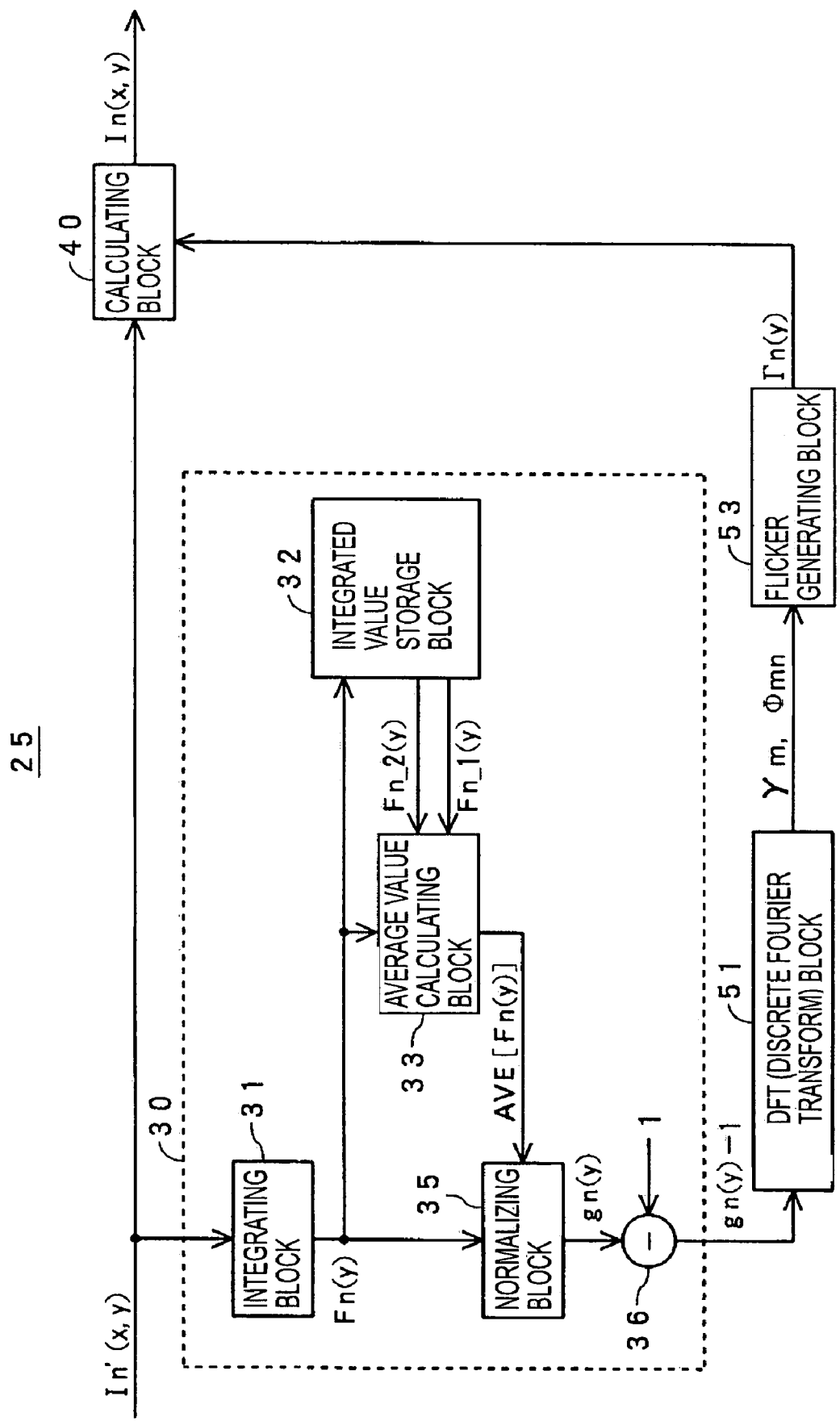
FIG. 6 illustrates a second example of the flicker reducer.

(Second Example of the Flicker Reduction Method: FIG. 6)

If the difference value $Fn(y)-Fn\_1(y)$ is normalized by the average value $AVE[Fn(y)]$ as shown in FIG. 4, a finite calculation accuracy is effectively achieved. If calculation accuracy requirement is satisfied, the integrated value $Fn(y)$ can be directly normalized by the average value $AVE[Fn(y)]$.

FIG. 6 illustrates such an example. The normalizing block 35 performs a normalization operation by dividing the integrated value $Fn(y)$ from the integrating block 31 by the average value $AVE[Fn(y)]$ from the average value calculating block 33, thereby outputting the normalized difference value $gn(y)$.

The normalized difference value $gn(y)$ is represented by equation (18) of FIG. 21A. As represented by equation (19) of FIG. 21B, a subtracter circuit 36 subtracts 1 from the normalized difference value $gn(y)$ represented by equation (18) and transfers the subtraction results to the DFT (discrete Fourier transform) block 51 to make the subsequent process of the arrangement of FIG. 6 identical to the subsequent process of the arrangement of FIG. 4.

Since $|Am|=\gamma m$ and $\theta m=\Phi mn$, $\gamma m$ and $\Phi mn$ are determined from equations (20a) and (20b) with reference to equations (15a) and (15b) of FIG. 20C.

In the example of FIG. 4, the DFT block 51 estimates the amplitude $\gamma m$ and the initial phase $\Phi mn$ of the flicker component of each order through the calculation of equations (16a) and (16b) after extracting the spectrum through the DFT operation defined by equation (13). In the example of FIG. 6, the DFT block 51 estimates the amplitude $\gamma m$ and the initial phase $\Phi mn$ of the flicker component of each order through the calculation of equations (20a) and (20b) after extracting the spectrum through the DFT operation defined by equation (13). The subsequent process remains unchanged from that of the arrangement of FIG. 4.

Since the example of FIG. 6 does not need the difference calculating block 34, the flicker reducer 25 is simplified accordingly.

In this example as well, the calculating block 40 preferably has the structure of FIG. 5.

Figure 7:
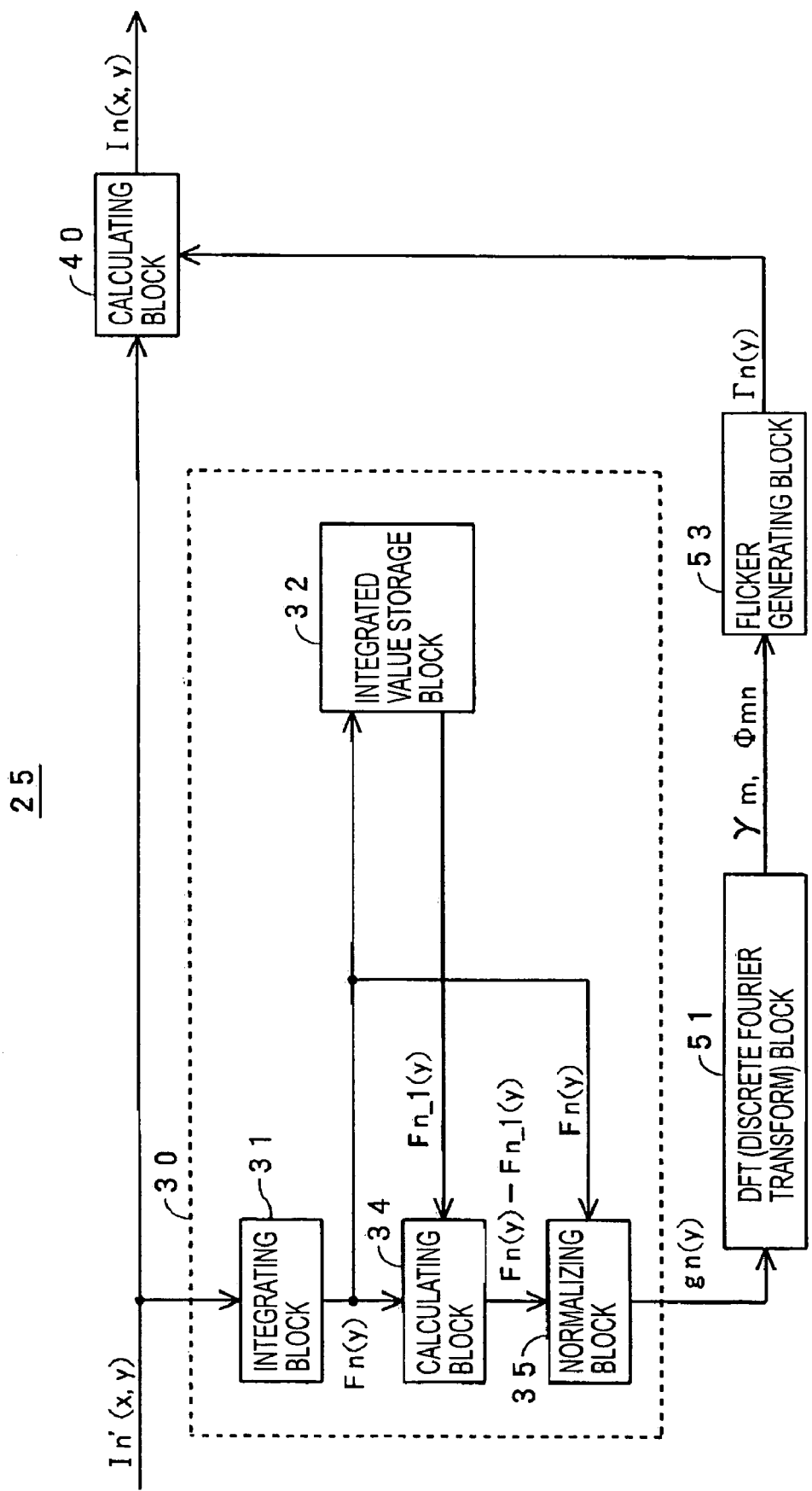
FIG. 7 illustrates a third example of the flicker reducer.

(Third Example of the Flicker Reduction Method: FIG. 7)

If the approximation defined by equation (7) of FIG. 18A holds, the average value AVE[Fn(y)] for use in the normalization in the example of FIG. 4 equals αn(y) defined by equation (6), and the second term [αn(y)*Fn(y)] of equation (4) of FIG. 17B significantly smaller than the first term αn(y) has an insignificant effect on the normalization.

The integrated value Fn(y) is used instead of the average value AVE[Fn(y)] in the normalization without any particular problem. The flicker component is effectively detected in the same manner as when the average value AVE[Fn(y)] is used.

In the example of FIG. 7, the normalizing block 35 performs a normalization operation by dividing the difference value Fn(y)–Fn_1(y) from the difference calculating block 34 by the integrated value Fn(y) from the integrating block 31. The subsequent process remains unchanged from that of the arrangement of FIG. 4.

In the example of FIG. 7, it is sufficient if the integrated value storage block 32 holds the integrated value of one field, and the average value calculating block 33 is not required. The flicker reducer 25 is thus simplified in structure.

In this example as well, the calculating block 40 preferably has the structure of FIG. 5.

Figure 8:
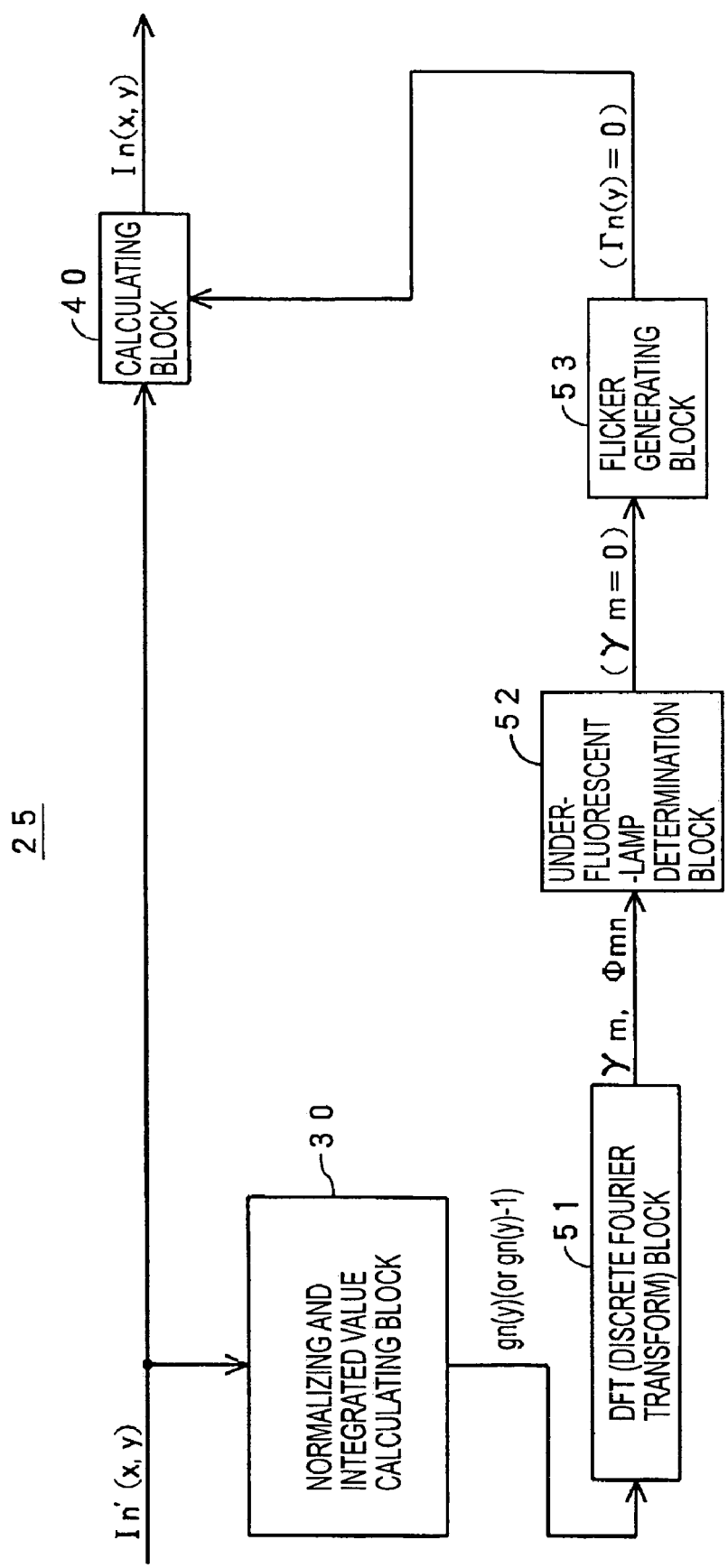
FIG. 8 illustrates one example of the flicker reducer under the illumination of a non-fluorescent lamp.
Figure 9:
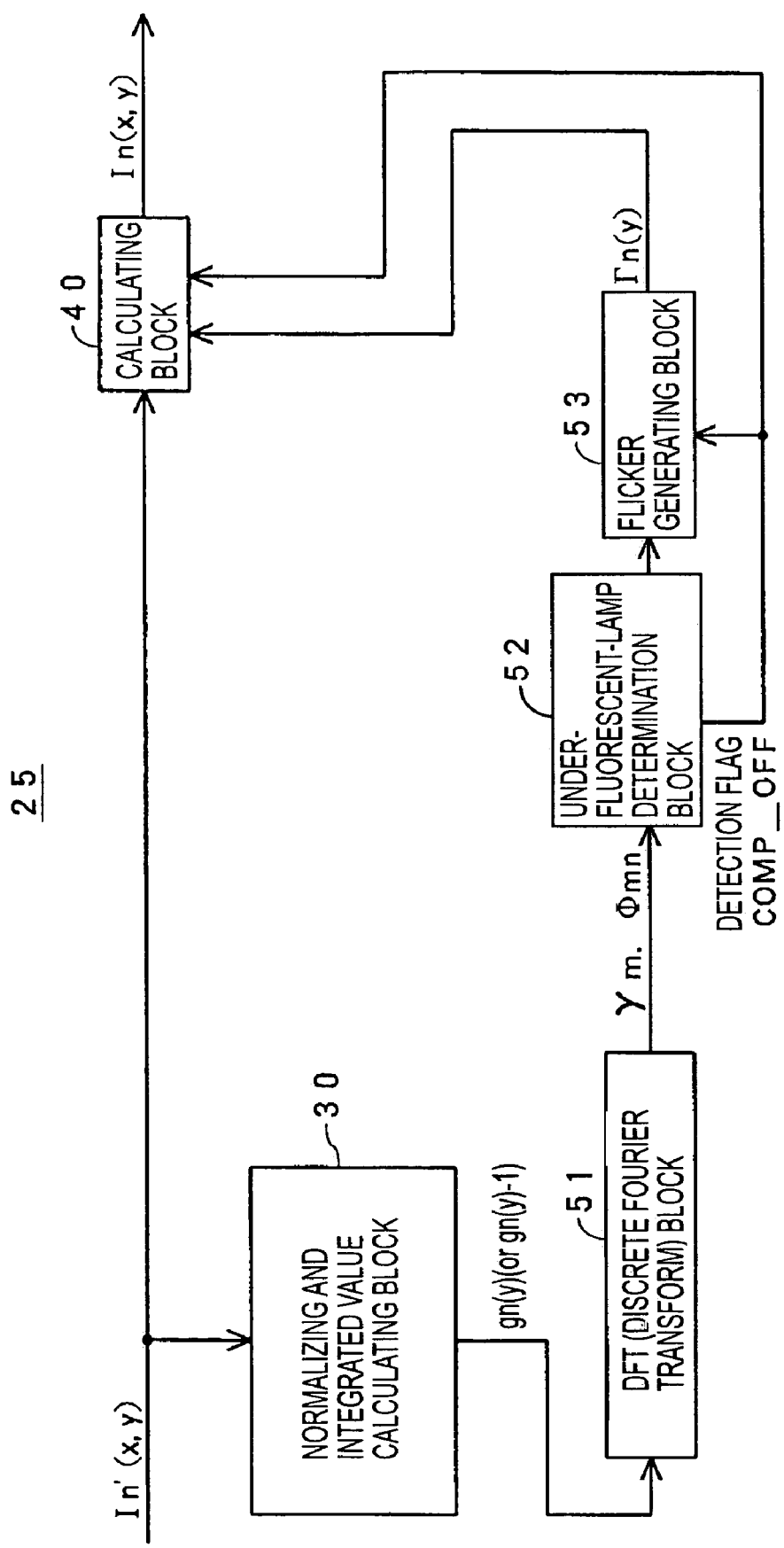
FIG. 9 illustrates another example of the flicker reducer under the illumination of a non-fluorescent lamp.

(Example of Another Process Performed Under Non-Fluorescent Lamp: FIG. 8 and FIG. 9)

No particular problem is presented in the above-referenced flicker reduction process when a photographing operation is performed under the illumination of a non-fluorescent lamp (under an non-fluorescent illumination environment). However, if an otherwise unnecessary process is performed, the effect on image quality becomes a concern even if the flicker component is low enough.

If a photographing operation is performed under the illumination of the non-fluorescent lamp, the flicker reduction process is preferably disabled. The flicker reducer 25 is preferably designed to output the input image signal In'(x,y) as is as an output image signal from the flicker reducer 25.

FIG. 8 illustrates an example of such a flicker reducer 25. A normalized and integrated value calculating block 30 is designed as shown in the example of FIG. 4, FIG. 6 or FIG. 7. In the example of FIG. 4 and FIG. 7, the difference value Fn(y)–Fn_1(y) rather than the integrated value Fn(y) is normalized, and for convenience of explanation, the corresponding block is also referred to as a normalized and integrated value calculating block.

In the example of FIG. 8, a under-fluorescent-lamp determination block 52 is arranged between the DFT block 51 and the flicker generating block 53.

Figure 22A:
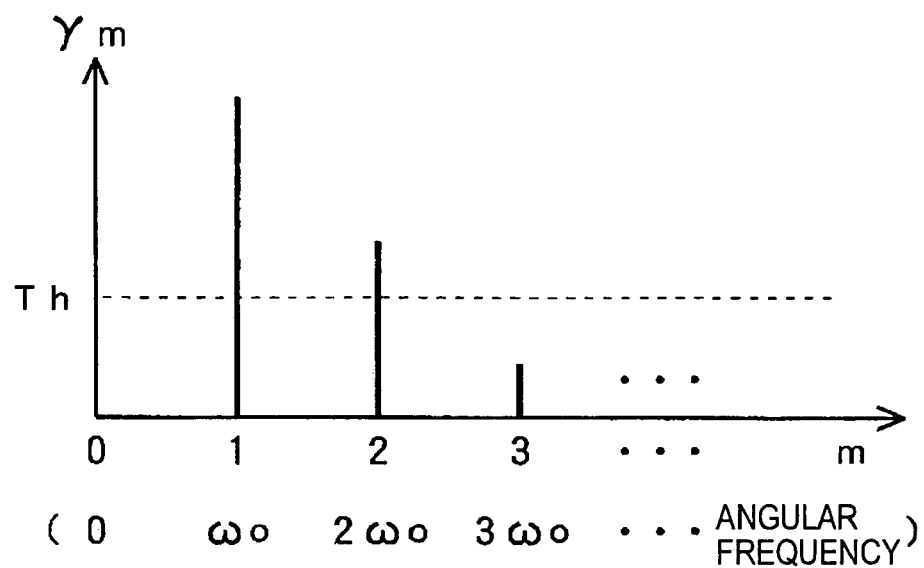
FIGS. 22A and 22B serve the purpose of explanation of FIG. 8 and FIG. 9.
Figure 22B:
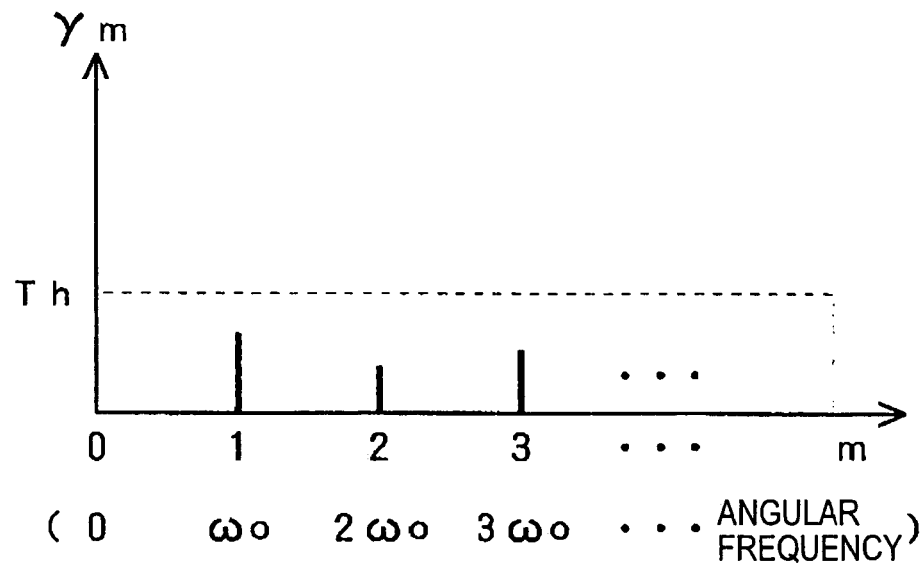

Under the illumination of the fluorescent lamp, the level (amplitude) γm of the calculated component of each order is sufficiently higher at m=1 than a threshold Th and sharply lowers as m increases as shown in FIG. 22A. Under the illumination of the non-fluorescent lamp, the level of the component is lower than the threshold Th at every order as shown in FIG. 22B.

The spectrum is ideally zero under the illumination of the non-fluorescent lamp. In practice, however, the subject moves, and the normalized difference value gn(y) or the normalized integrated value gn(y)–1, generated from the signals of a plurality of consecutive fields, inevitably contains a tiny amount of frequency component.

The under-fluorescent-lamp determination block 52 thus determines whether the level at m=1 is above the threshold Th. If it is determined that the level at m=1 is above the threshold Th, the under-fluorescent-lamp determination block 52 determines that the photographing operation is performed under the illumination of the fluorescent lamp. The estimated values of γm and Φmn from the DFT block 51 are directly output to the flicker generating block 53. In this case, the above-described flicker reduction process is executed.

If the level of the component at m=1 is lower than the threshold Th, the under-fluorescent-lamp determination block 52 determines that the photographing operation is performed under the non-fluorescent lamp, and sets the estimated value of γm of all order m to be zero. The flicker coefficient Γn(y) becomes zero, and the input image signal In'(x,y) is output as is as an output image signal from the calculating block 40.

FIG. 9 illustrates such an example. In this example, as in the example of FIG. 8, the under-fluorescent-lamp determination block 52 determines whether the photographing operation is performed under the under the illumination of the fluorescent lamp. If it is determined that the photographing operation is performed under the illumination of the non-fluorescent lamp, the under-fluorescent-lamp determination block 52 sets a detection flag COMP_OFF, stops the process of the flicker generating block 53 and the calculating block 40, and outputs the input image signal In'(x,y) as is as an output image signal from the calculating block 40. If it is determined that the photographing operation is performed under the illumination of the fluorescent lamp, the under-fluorescent-lamp determination block 52 resets the detection flag COMP_OFF and the flicker reduction operation is thus performed.

If the photographing operation is performed under the illumination of the non-fluorescent lamp in the example of FIG. 9, not only an adverse effect on image quality is prevented but also power consumption is reduced.

Figure 10:
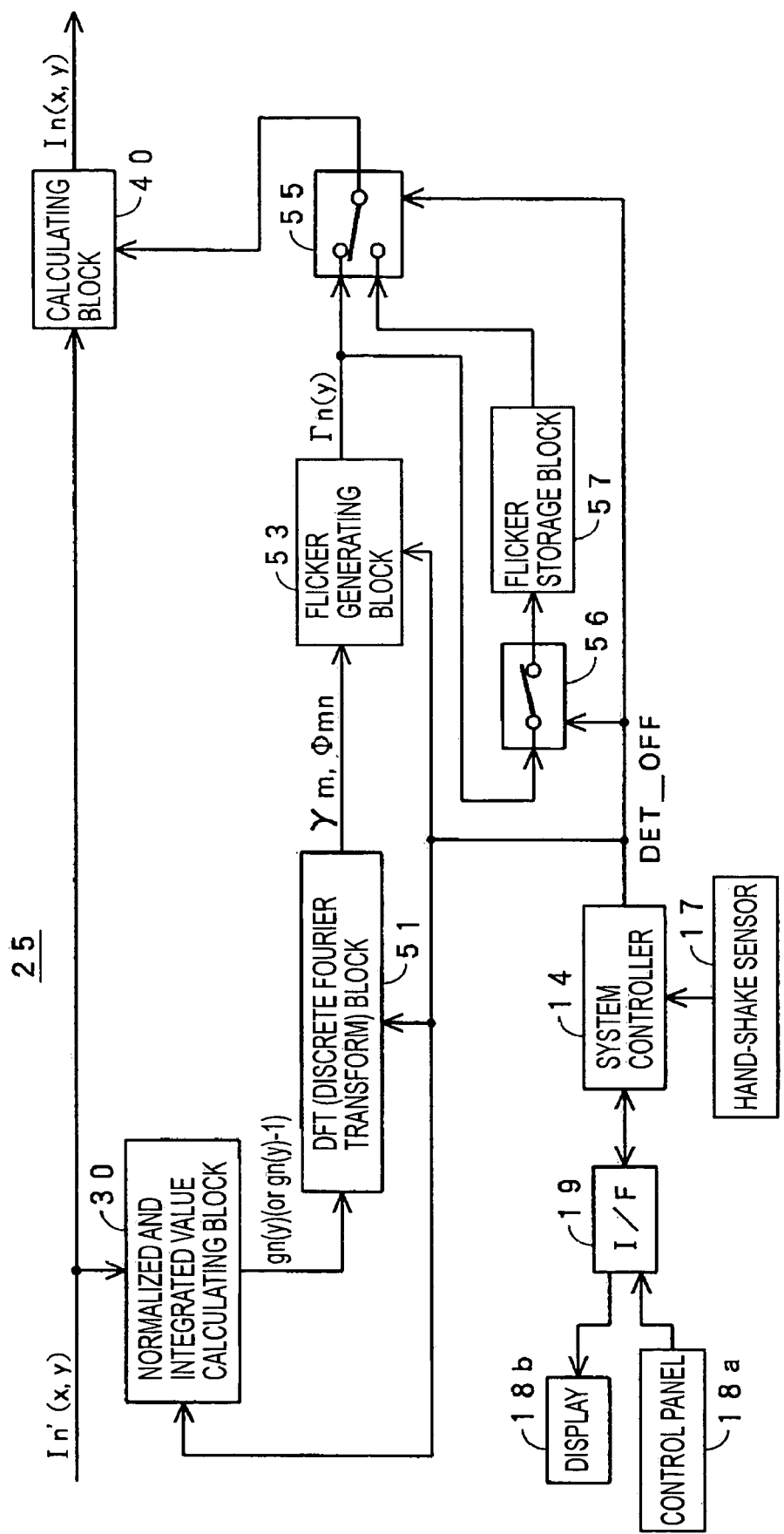
FIG. 10 illustrates an image pickup device that takes into account a subject that changes greatly in a short period of time in response to an operation or an action of a photographer.

(Subject Greatly Changing in Response to an Operation or an Action of a Photographer: FIG. 10)

A subject occasionally changes in a short period of time in response to zooming, panning, tilting, or hand-shaking of a photographer. In such a case, the assumption of equation (7) of FIG. 18A fails to hold. As a result, the flicker detection accuracy is degraded.

The image pickup device is constructed as shown in FIG. 10 taking into consideration a subject that changes greatly in a short period of time in response to an operation or an action of a photographer.

As shown in FIG. 10, switches 55 and 56 and a flicker storage block 57 are arranged between the flicker generating block 53 and the calculating block 40 additionally to the flicker reducer 25 of FIG. 4, FIG. 6, or FIG. 7. The detection flag DET_OFF, to be discussed later, output from the system controller 14 is fed to the switches 55 and 56 as a switching signal.

The flicker storage block 57 stores the flicker coefficient Γn(y) of the three fields. Each time the process of one field is complete, the flicker coefficient Γn(y) is stored for use in the next field. The output read from the flicker storage block 57 is switched every three fields.

The system controller 14 detects a subject if the subject changes greatly in a short period of time in response to the operation or the action of the photographer.

For example, if the photographer presses a zoom key on the control panel 18a, the system controller 14 detects the pressing via the interface 19. The system controller 14 controls lenses in response to the photographer's zoom operation such as a telephoto and a wide-angle operation. The hand-shaking of the photographer is detected by the hand-shake sensor 17, and the information of the hand-shaking is sent to the system controller 14. In response to the hand-shake information, the system controller 14 performs anti-shake control. Upon detecting panning or tilting, the system controller 14 lightens the degree of anti-shake correction during panning, for example. Such control techniques remain unchanged from those that are performed in ordinary cameras.

In the example of FIG. 10, the system controller 14 sets the detection flag DET_OFF if the operation or the action of the photographer causing the subject to be changed greatly in a short period of time is detected. The system controller 14 resets the detection flag DET_OFF if neither of such operation and action is performed.

In a normal state under which the subject does not change greatly in a short period of time, the detection flag DET_OFF is reset. In the flicker reducer 25, the switch 55 is set to the side thereof to the flicker generating block 53. The flicker coefficient $\Gamma n(y)$ is fed from the flicker generating block 53 to the calculating block 40. The flicker reduction operation is performed. With the switch 56 turned on, the flicker coefficient $\Gamma n(y)$ is stored in the flicker storage block 57.

The detection flag DET_OFF is set if the subject changes greatly in a short period of time in response to the operation or the action of the photographer. In the flicker reducer 25, the switch 55 is set to the side thereof to the flicker storage block 57. The calculating block 40 receives the flicker coefficient $\Gamma n(y)$ at a high detection precision level immediately prior to the operation or the action of the photographer, read from the flicker storage block 57, instead of the flicker coefficient $\Gamma n(y)$ at a low detection precision level. The flicker reduction operation is performed. The switch 56 is turned off, and thus prevents the flicker coefficient $\Gamma n(y)$ at the low detection precision level from being stored onto the flicker storage block 57.

The flicker detection accuracy is heightened even when the subject changes greatly in a short period of time in response to the operation or the action of the photographer. The flicker is reliably and sufficiently reduced.

Furthermore, the detection flag DET_OFF is supplied to the normalized and integrated value calculating block 30, the DFT block 51, and the flicker generating block 53. If the subject changes greatly in a short period of time in response to the operation or the action of the photographer, the detection flag DET_OFF is set. The set detection flag DET_OFF stops the process of each of the normalized and integrated value calculating block 30, the DFT block 51, and the flicker generating block 53. In this case, power consumption is also reduced.

In this case, the flicker coefficient $\Gamma n(y)$ is replaced with the immediately prior flicker coefficient thereof. A more front stage signal, for example, an integrated value $Fn(y)$, may be replaced with the immediately prior signal thereof.

Figure 11:
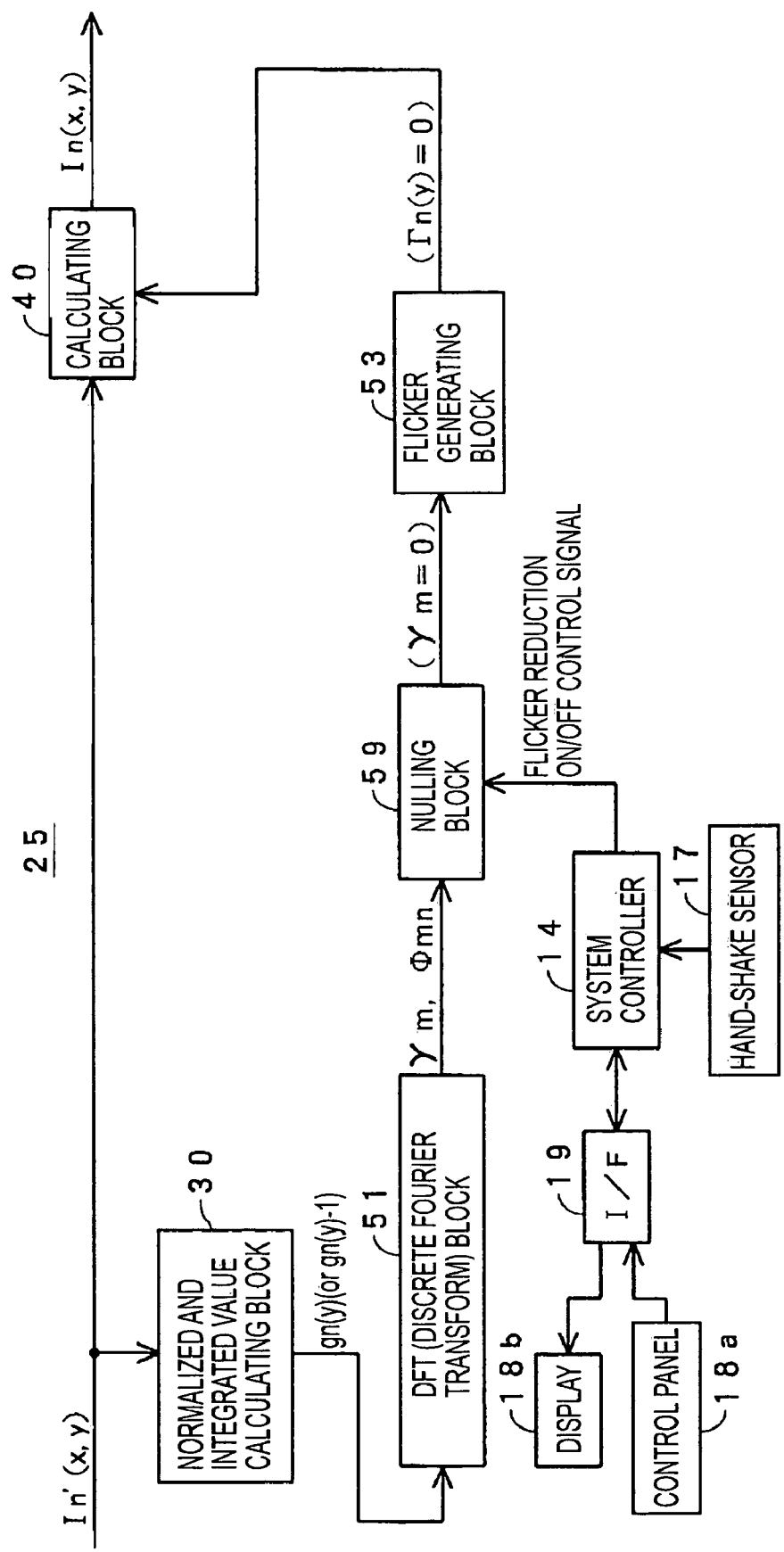
FIG. 11 illustrates one example of image pickup device that takes into account the flicker component reduction process that becomes unnecessary depending on a photographing condition.
Figure 12:
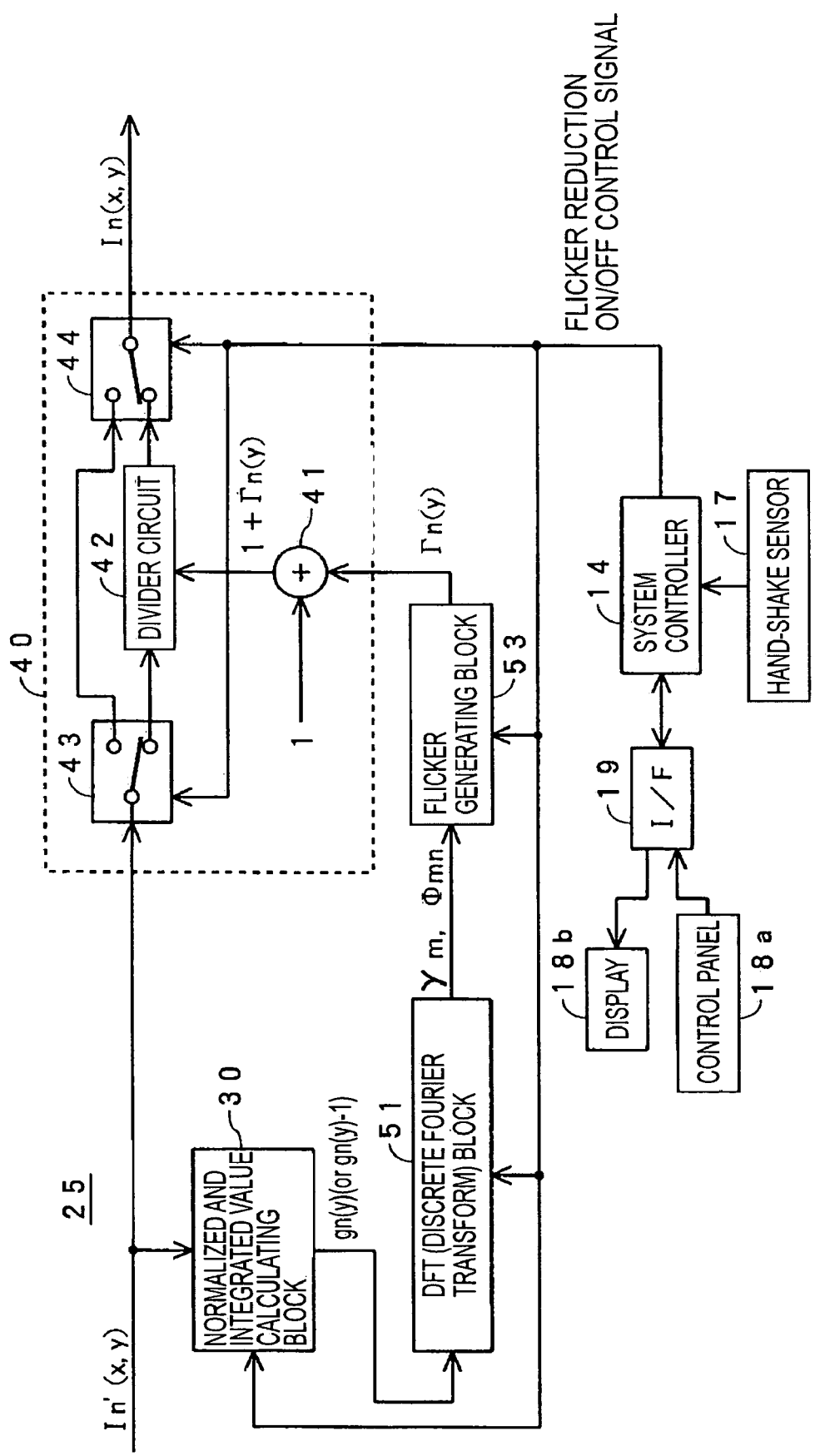
FIG. 12 illustrates another example of image pickup device that takes into account the flicker component reduction process that becomes unnecessary depending on a photographing condition.

(Example of Another Process Performed Depending on Photographing Condition: FIG. 11 and FIG. 12)

As will be discussed later, the flicker reduction operation becomes unnecessary depending on the photographing condition. In view of the effect on image quality, performing otherwise unnecessary flicker reduction operation is undesirable when the photographing operation is performed under the illumination of the non-fluorescent lamp as described above.

First, the photographing conditions that require no flicker reduction operation include the case in which a video camera or a digital still camera, each capable of taking both a moving image and a still image, photographs a still image.

A camera employing an XY addressing type image pickup element such as a CMOS image pickup element can set exposure timings of all pixels in one frame (including exposure start timings and exposure end timings) to be uniform, and can control the effect of the fluorescent light flicker. A reading operation from the image pickup element is free from the limitation of frame rate that is applied to moving image capturing, and is thus performed at a slow speed in a light blocked state with a mechanical shutter closed.

Based on a camera operation on the control panel 18$a$ in the embodiment of FIG. 1, the system controller 14 determines whether to take a still image with the exposure of all pixels in one frame set to the same timing.

Second, the photographing states that need no flicker reduction operation also include the case in which a photographing operation is performed outdoors under the light of the sun, and the case in which the exposure time (electronic shutter time) is set to be an integer multiple of periods ($\frac{1}{100}$ second) of luminance changes of the fluorescent light by adjusting the amount of exposure.

Whether the photographing operation is performed under the illumination of the fluorescent lamp is determined by referencing the level of the spectrum extracted by the DFT block 51 as previously discussed with reference to FIGS. 8 and 9. The photographing operation performed outdoors under the light of the sun is categorized as a photographing operation under the illumination of the non-fluorescent lamp, and in this case, the system controller 14 directly determines from the amount of light of a subject that a photographing operation is performed under the illumination of the non-fluorescent lamp.

As previously discussed, the camera employing the XY addressing type image pickup element such as a CMOS image pickup element is free from the fluorescent light flicker if the exposure time is set to be an integer multiple of the periods ($\frac{1}{100}$ second) of the luminance changes of the fluorescent lamp. The system controller 14 directly detects whether the exposure time is set to be an integer multiple of periods of the luminance change of the fluorescent lamp by adjusting the exposure amount.

If the system controller 14 determines that the photographing state requires no flicker reduction operation, the flicker reduction operation is not effected. The system is designed so that the input image signal $In'(x,y)$ is output as is as an output image signal from the flicker reducer 25.

FIG. 11 illustrates one example of such a system configuration. In this example of the flicker reducer 25, a nulling block 59 is arranged between the DFT block 51 and the flicker generating block 53. The nulling block 59 is controlled by a flicker reduction on/off control signal from the system controller 14.

If the system controller 14 determines that the flicker reduction operation is required, the flicker reduction on/off control signal is set to an on state, and the nulling block 59 outputs the estimated values of $\gamma m$ and $\Phi mn$ from the DFT block 51, as are, to the flicker generating block 53. In this case, the flicker reduction operation is effected.

If the system controller 14 determines that the flicker reduction operation is unnecessary, the flicker reduction on/off control signal is set to an off state. The nulling block 59 nulls the estimated value of $\gamma m$ of the order m to zero. In this case, the flicker coefficient $\Gamma n(y)$ also becomes zero, and the input image signal $In'(x,y)$ is output as is as an output image signal from the calculating block 40.

FIG. 12 illustrates still another example. The calculating block 40 in the flicker reducer 25 includes the adder circuit 41, the divider circuit 42 and the switches 43 and 44, all shown in FIG. 5, but does not include the saturation level determining circuit 45 of FIG. 5. The switches 43 and 44 are controlled for switching by the flicker reduction on/off control signal from the system controller 14.

If the system controller 14 determines that the flicker reduction operation is necessary, the switches 43 and 44 are set to the side thereof to the divider circuit 42. As previously discussed, the calculation result of equation (17) is output as an output image signal from the calculating block 40.

If the system controller 14 determines that no flicker reduction operation is necessary, the switches 43 and 44 are set to the sides thereof opposite from the divider circuit 42, and the input image signal In'(x,y) is output as is as an output image signal from the calculating block 40.

In the example of FIG. 12, the flicker reduction on/off control signal is fed to the normalized and integrated value calculating block 30, the DFT block 51, and the flicker generating block 53. If the system controller 14 determines that no flicker reduction operation is necessary, the process of each of the normalized and integrated value calculating block 30, the DFT block 51 and the flicker generating block 53 is stopped. Power consumption is thus reduced in this example.

Figure 13:
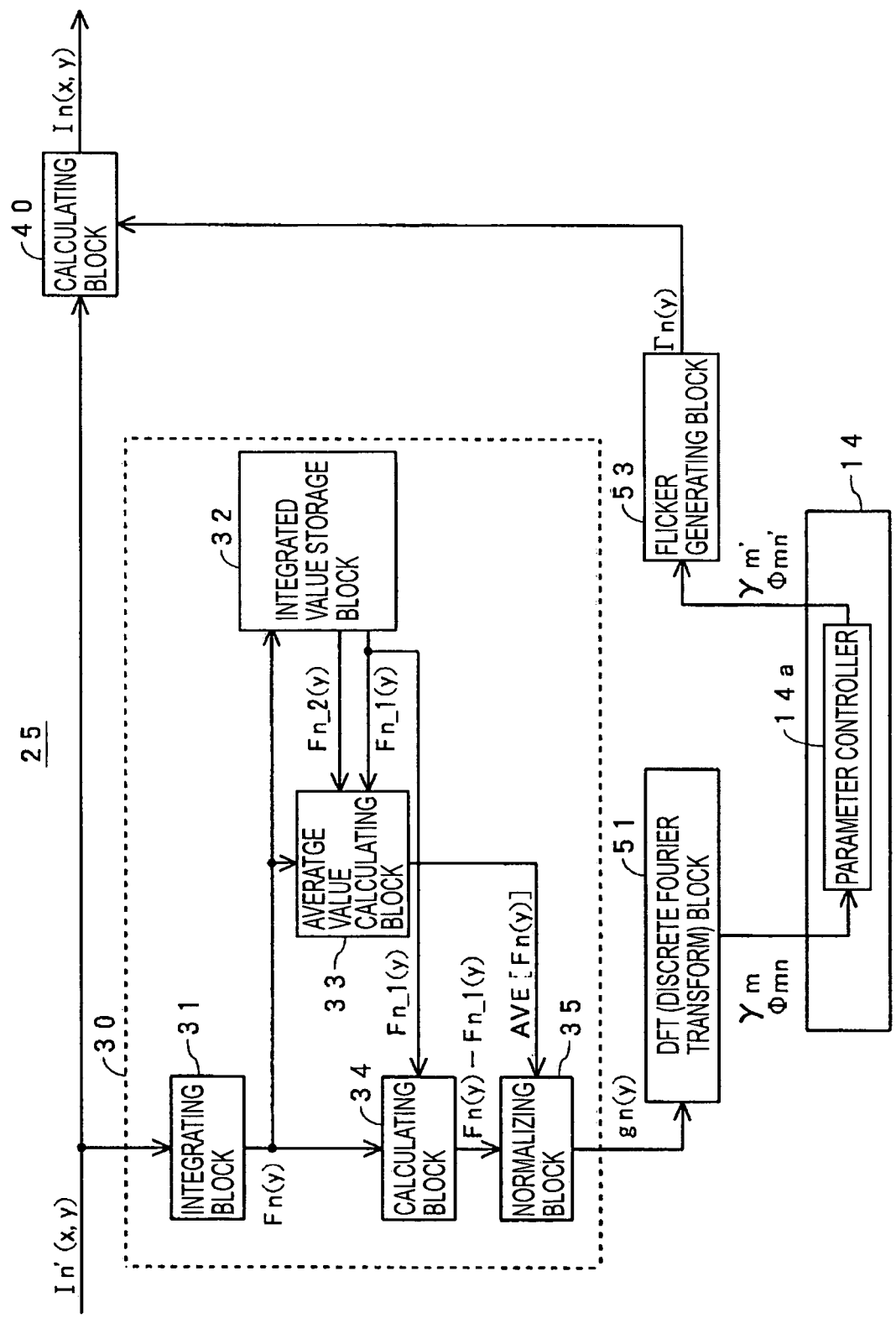
FIG. 13 illustrates a basic configuration to adjust an estimated flicker component.
Figure 14:
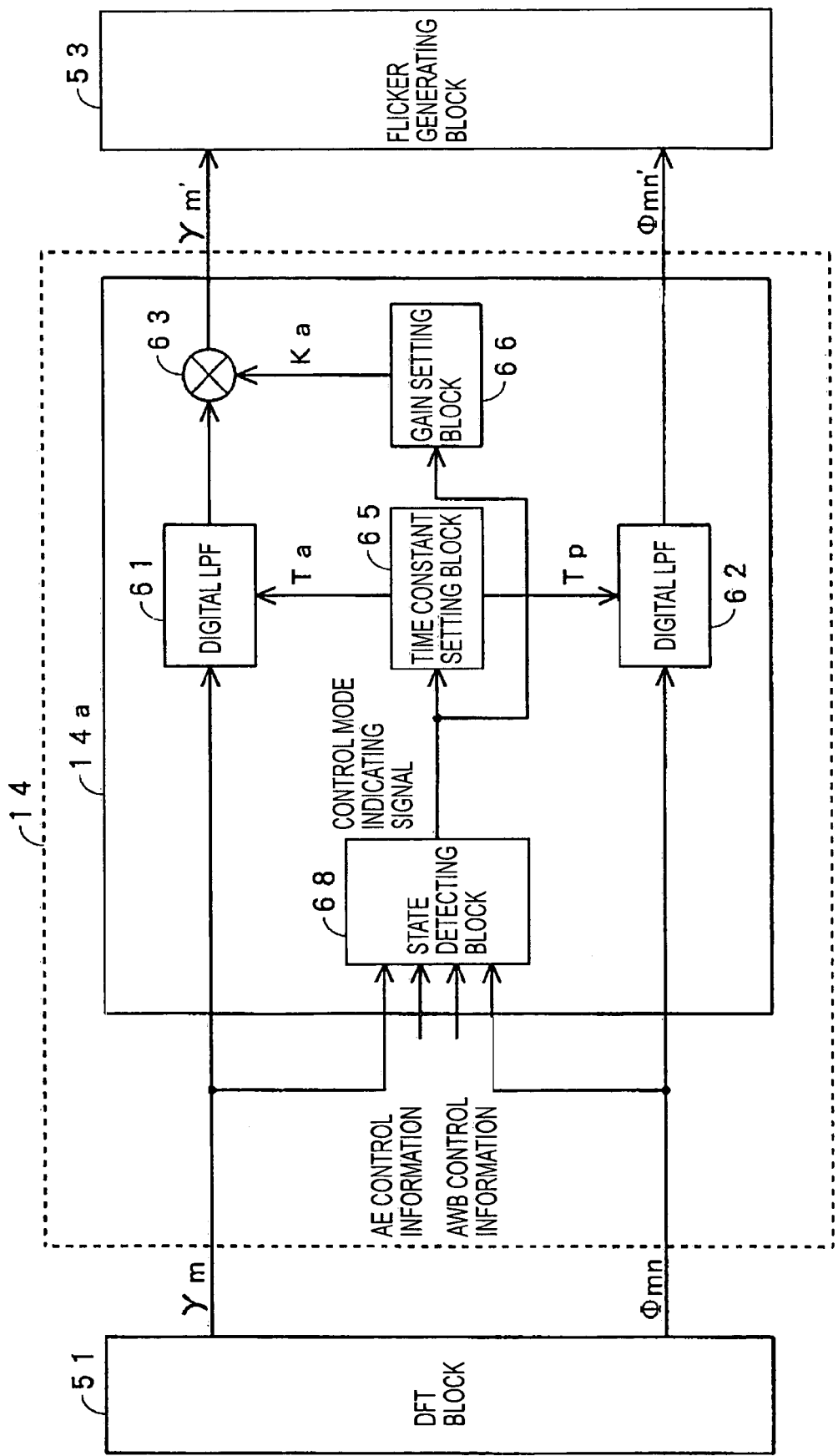
FIG. 14 illustrates a first specific example for adjusting the estimated flicker component.
Figure 15:
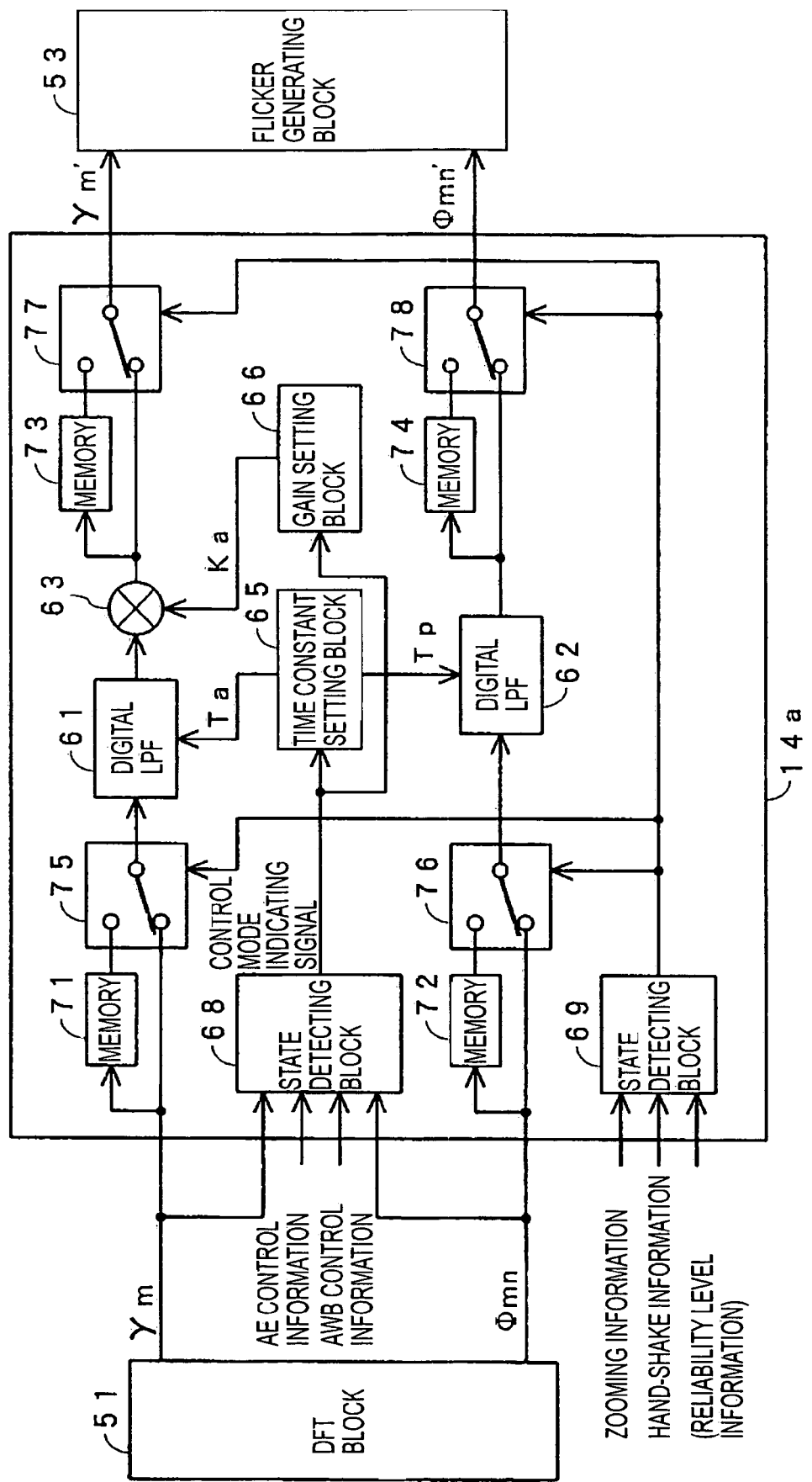
FIG. 15 illustrates a second specific example for adjusting the estimated flicker component.

(Adjustment of Detected Flicker Component: FIG. 13-FIG. 15)

In accordance with each of the above-referenced methods, the flicker component in the input image signal is reliably and effectively reduced when the fluorescent light flicker is steadily and regularly generated.

However, in each of the above-referenced methods, the average calculation or the difference calculation is performed throughout a plurality of fields to detect the flicker component. For this reason, the flicker component cannot be accurately detected in a transitional and unstable state, for example, at the moment the fluorescent lamp is switched on or off or at the moment of any person's entrance into or exit out of the room illuminated by a fluorescent lamp. If the flicker reduction operation is effected in accordance with the flicker component obtained in such a transitional and unstable state, an undesirable correction can be performed on the input image signal.

A variation in an angle of field in a horizontal direction can be caused in response to a horizontal motion of a subject, a camera operation such as panning and zooming, and hand shaking of a photographer. Such variations are reliably and stably reduced. However, flicker reduction performance is slightly lowered for a variation in the angle of view in a vertical direction caused in response to a vertical motion of the subject, the camera operation such as panning and zooming, and hand shaking of the photographer.

This problem is eliminated by the method illustrated in FIG. 10. In accordance with this method, however, the flicker component $\Gamma n(y)$ is switched between when the subject is stable free from a large variation in a short period of time and when the subject changes greatly in a short period of time in response to an operation or an action of the photographer. For this reason, the photographer may feel the image of the subject discordant.

The effect of external disturbance cannot be controlled even in a normal stable state. In the method of FIG. 10, the image pickup device responds directly to the external disturbance because of the fast tracking feature thereof, and suffers from an error in the flicker reduction against the object of the flicker reduction operation.

To reduce the effect of external disturbance, a filtering operation using an LPF (low-pass filter) is performed in the course of estimating the flicker component, and a time constant thereof is prolonged to slow the tracking feature in the flicker estimation.

However, the setting of slow tracking feature also results in a slow tracking feature in the above-referenced transitional state. The flicker reduction operation cannot be performed quickly although the flicker reduction operation is required, for example, at the moment the fluorescent lamp is switched on or at the moment of any person's entrance into the room illuminated by the fluorescent lamp. Conversely, the flicker reduction operation is continuously performed although the flicker reduction operation is required no longer, for example, at the moment the fluorescent lamp is switched off or at the moment of any person's exit out of the room illuminated by the fluorescent lamp.

Instead of performing the calculation operation on the detected flicker component and the input image signal, the amplitude and the phase of the detected flicker component are adjusted as necessary, and then the adjusted flicker component and the input image signal are subjected to the calculation operation. In this way, the flicker reduction operation is flexibly and properly performed in a variety of cases.

In the following example, parameters related to the flicker reduction operation, for example, the amplitude and the phase of the estimated flicker component are adjusted.

FIG. 13 illustrates a basic structure of such an arrangement. In this example, the system controller 14 captures data of the amplitude $\gamma m$ and the initial phase $\Phi mn$ of the estimated flicker component from the DFT block 51 in the flicker reducer 25. A parameter controller 14a in the system controller 14 adjusts the data as described later, and inputs the adjusted data of the amplitude $\gamma m'$ and initial phase $\Phi mn'$ to the flicker generating block 53 in the flicker reducer 25.

The flicker generating block 53 calculates the flicker coefficient $\Gamma n(y)$, represented by equation (2) of FIG. 17A, from the adjusted data of the amplitude $\gamma m'$ and initial phase $\Phi mn'$ instead of the amplitude $\gamma m$ and initial phase $\Phi mn$ obtained from the DFT block 51. In this example, $\gamma m$ and $\Phi mn$ are replaced with $\gamma m'$ and $\Phi mn'$ in equation (2) of FIG. 17A.

As shown in FIG. 13, the normalized and integrated value calculating block 30 in the flicker reducer 25 has the same structure as the counterpart in FIG. 4. Alternatively, the normalized and integrated value calculating block 30 may have the same structure as the counterpart shown in FIG. 6 or FIG. 7.

<First Specific Example: FIG. 14>

FIG. 14 illustrates a first specific example of the system controller 14.

The number of lines for data of the amplitude $\gamma m$ and the initial phase $\Phi mn$ from the DFT block 51 are m per field in practice, but a single line only is shown. The same is true of the output data of the amplitude $\gamma m'$ and the initial phase $\Phi mn'$ from the parameter controller 14a.

The data of the amplitude $\gamma m$ and the initial phase $\Phi mn$ from the DFT block 51 are fed to digital LPFs (low-pass filters) 61 and 62, the output data of the digital LPF 61 is fed to a gain adjusting circuit (multiplier circuit) 63, and the output data of the gain adjusting circuit 63 is input to the flicker generating block 53 as adjusted amplitude $\gamma m'$. The output data of the digital LPF 62 is input to the flicker generating block 53 as adjusted initial phase $\Phi mn'$.

A time constant Ta of the digital LPF 61 and a time constant Tp of the digital LPF 62 are set by the time constant setting block 65. A gain (multiplication coefficient) Ka of the gain adjusting circuit 63 is set by a gain setting block 66.

Preferably, the time constants of the digital LPFs 61 and 62 are continuously set to any value within a constant range. If a desired time constant cannot be set, a time constant close to the desired one may be set. If a single LPF cannot continuously change the time constant, a plurality of LPFs having separate time constants may be internally arranged, and by providing time constants Ta and Tp as a control code to the LPFs, a single LPF may be selected from the plurality of LPFs.

The initial phase Φmn periodically varies during the generation of flickering. For example, if the frequency of the commercial AC power source is 50 Hz and the vertical synchronization frequency of the camera is 60 Hz, the initial phase Φmn becomes the same value every three fields, and a difference of the initial phase Φmn takes place from the immediately prior field as represented by equation (3) of FIG. 17A.

The digital LPF 62 must serve as one LPF for the data of the same phase taking into consideration the variation in the initial phase Φmn. More specifically, if the variation period of the initial phase Φmn is three fields as described above, three LPFs are arranged as the digital LPF 62, and the data of the initial phase Φmn is distributed among the three LPFs.

A state detecting block 68 receives the data of the amplitude γm and the initial phase Φmn, and AE (automatic exposure) control information and AWB (automatic white balance) control information, obtained in the system controller 14. More specifically, the AE control information is on-screen brightness information, and the AWB control information is color temperature information and information as to whether the camera is illuminated under a fluorescent lamp.

In response to these inputs, the state detecting block 68 detects the photographing conditions affecting the generation of the fluorescent light flicker. More specifically, the state detecting block 68 determines whether a current photographing condition is under the illumination of the fluorescent lamp, or a transitional state from the illumination of the non-fluorescent lamp to the illumination of the fluorescent lamp when the fluorescent lamp is turned on or a transitional state from the illumination of the fluorescent lamp to the illumination of the non-fluorescent lamp when the fluorescent lamp is turned off. In response to the determination results, a control mode is determined.

A control mode indicating signal is fed to the time constant setting block 65 and the gain setting block 66 to indicate the determined control mode thereto. In response, the time constant setting block 65 sets the time constants Ta and Tp in the digital LPFs 61 and 62, respectively, and the gain setting block 66 sets the gain Ka in the gain adjusting circuit 63.

FIG. 16 lists determination criteria for the state detection of the state detecting block 68. If the flickering occurs steadily and regularly under the illumination of the fluorescent lamp, the amplitude γm of the estimated flicker component becomes generally constant, and the initial phase Φmn takes substantially the same value every constant period (every three fields at a commercial power source frequency of 50 Hz and a camera vertical synchronization frequency of 60 Hz).

These inputs are sufficient to cause the state detecting block 68 to determine that the flicker is generated steadily and regularly under the illumination of the fluorescent lamp.

Since the on-screen brightness varies generally periodically under the illumination of the fluorescent lamp, the brightness information for the AE control is sufficient to cause the state detecting block 68 to determine that the camera is under the illumination of the fluorescent lamp.

In the AWE control, a light source is estimated from detected color information, and a determination of whether the light source is a fluorescent lamp is determined based on the estimated light source. A determination of whether the camera is under the illumination of the fluorescent lamp can be performed based on the light source estimating information for the AWB control.

The above-referenced information over a plurality of past fields is generally checked to enhance detection accuracy.

Upon determining that the flickering takes place steadily and regularly under the illumination of the fluorescent lamp, the state detecting block 68 sets, as the control mode, a mode A to be discussed later.

If no flickering takes place regularly under the illumination of the non-fluorescent lamp, the amplitude γm of the estimated flicker component contains only a noise component, and varies randomly in the vicinity of zero, and the initial phase Φmn randomly varies because of the noise.

Such information is sufficient for the state detecting block 68 to determine that no flicker reduction operation is necessary under the illumination of the non-fluorescent lamp.

From the brightness information for the AE control indicating that variations in the screen brightness have no periodicity under the illumination of the non-fluorescent lamp, the state detecting block 68 determines that the camera is under the illumination of the non-fluorescent lamp. From the light source estimating information for the AWB control, the state detecting block 68 determines that the camera is under the illumination of the non-fluorescent lamp.

In this example, the above-referenced information over a plurality of past fields is generally checked to enhance detection accuracy.

Upon determining that no flickering takes place steadily and regularly under the illumination of the non-fluorescent lamp (that no flicker reduction operation is necessary), the state detecting block 68 sets, as the control mode, a mode B to be discussed later.

In response to the control mode determined by the state detecting block 68, the time constant setting block 65 sets the time constants Ta and Tp of the digital LPFs 61 and 62, and the gain setting block 66 sets the gain Ka of the gain adjusting circuit 63. Actual values to be set are determined as described below in response to the system configuration and requirements to the system.

The time constant Ta of the digital LPF 61 is discussed first. As previously discussed, the amplitude γm of the estimated flicker component slightly varies in the vicinity of zero and is generally constant in both the mode A (in which the flickering takes place steadily and regularly under the illumination of the fluorescent lamp) and the mode B (in which no flickering takes place regularly under the illumination of the non-fluorescent lamp). If external disturbance is applied, the amplitude γm is not constant.

To make the system robust to the external disturbance, the time constant Ta of the digital LPF 61 is preferably set to be longer. However, if the control mode is transitioned from the mode A to the mode B or from the mode B to the mode A, the time constant Ta of the digital LPF 61 is preferably set to be shorter to achieve a fast tracking feature during transitions.

More specifically, the amplitude γm must satisfy two mutually contradictory requirements at the same time. The method of FIG. 4, FIG. 6, or FIG. 7 provides an algorithm originally robust to the external disturbance.

In practice, a shorter time constant Ta is set with a view to the tracking feature. Most preferably, dynamic control may be introduced to provide a longer time constant Ta in either the mode A or the mode B and a shorter time constant Ta in a transition from the mode A to the mode B or in a transition from the mode B to the mode A.

The time constant Tp of the digital LPF 62 is discussed now. During the mode A (when the flickering takes place steadily and regularly under the illumination of the fluorescent lamp), the initial phase Φmn becomes substantially the same value every constant period based on the principle of the flicker generation as shown in FIG. 16. A sufficiently longer time constant Tp needs to be set to be robust to the external disturbance.

In contrast, the initial phase Φmn takes a random number during the mode B (when no flickering takes place regularly under the illumination of the non-fluorescent lamp), and no particular advantage is provided by the setting of a longer time constant Tp. More specifically, during the mode B, the time constant Tp may be set to any value taking into consideration the effect of a gain adjustment to be discussed later.

The time constant Ta and the time constant Tp may be alternated between the mode A and the mode B.

The gain Ka of the gain adjusting circuit 63 is now discussed. During the mode A (when the flickering takes place steadily and regularly under the illumination of the fluorescent lamp), the amplitude γm is substantially constant as shown in FIG. 16, and the gain Ka can be set to 1.

The gain Ka determines a correction rate of the amplitude γm (if a gain Ka=1 is set, 100% of the input is output with a correction rate at zero), and the correction rate of the amplitude γm is directly controlled by varying the gain Ka.

Under actual photographic environments, the amplitude may be intentionally enlarged or intentionally decreased. For this reason, the gain Ka is not limited to 1, and the system may be designed to set the gain Ka to be larger than 1 or smaller than 1.

During the mode B (in the state that no flicker is generated steadily under the illumination of the non-fluorescent lamp), the amplitude γm takes a random value in the vicinity of zero in response to noise. Since no flicker reduction operation is required by nature during the mode B, the gain Ka is set to zero to disable the unnecessary process.

The mode A and the mode B as the steady state (the state that the flicker is steadily generated or the state that no flicker is steadily generated) have been discussed. If the mode detected by the state detecting block 68 is transitioned from the mode A to the mode B, it is likely that the photographic environment has changed from under the illumination of the fluorescent lamp to under the illumination of the non-fluorescent lamp. If the mode detected by the state detecting block 68 is transitioned from the mode B to the mode A, it is likely that the photographic environment has changed from under the illumination of the non-fluorescent lamp to under the illumination of the fluorescent lamp.

As previously discussed with reference to FIG. 4, FIG. 6, or FIG. 7, in accordance with the basic method of the present invention, the flicker component is extracted through the averaging operation or the difference operation throughout a plurality of fields. During the transition, one portion of a signal string for use in the averaging operation or the difference operation contains a flicker component and another portion of the signal string has no flicker component.

As a result, an error takes place in the flicker component obtained through the averaging operation or the difference operation, and an error also takes place in the detected amplitude γm and initial phase Φmn. If the flicker coefficient Γn(y) is calculated from the error-affected amplitude γm and initial phase Φmn, the output image signal is also adversely affected.

To alleviate this problem, the gain setting block 66 detects a transitional state and controls the gain Ka in response to the transitional state.

More specifically, if the control mode is shifted from the mode A to the mode B, the reliability of each of the amplitude γm and the initial phase Φmn has dropped at the start of the transition. Immediately subsequent to the transition, the gain Ka is switched from 1 to zero, and the flicker reduction operation of the flicker generating block 53 and the calculating block 40 is stopped. Alternatively, the gain Ka is gradually lowered, and the flicker reduction operation of the flicker generating block 53 and the calculating block 40 is smoothly stopped.

Conversely, if the control mode is transitioned from the mode B to the mode A, the reliability of each of the amplitude γm and the initial phase Φmn is still low at the start of the transition. After time elapse until the reliability of each of the amplitude γm and the initial phase Φmn rises to a sufficiently high level, the flicker generating block 53 and the calculating block 40 performs the flicker reduction operation. Alternatively, the gain Ka is gradually raised so that the flicker generating block 53 and the calculating block 40 smoothly perform the flicker reduction operation.

<Second Specific Example: FIG. 15>

FIG. 15 illustrates a second specific example of the system controller 14.

In this example, memories 71-74, switches 75-78, and a state detecting block 69 are added to the example of FIG. 14.

The memory 71 stores the data of the amplitude γm, the memory 72 stores the data of the initial phase Φmn, the memory 73 stores the output data of the gain adjusting circuit 63, and the memory 74 stores the output data of the digital LPF 62. The switches 75-78 select the input data and the output data of the memories 71-74, respectively, in response to the detection results of the state detecting block 69. The output data of the switch 75 is fed to the digital LPF 61, the output data of the switch 76 is fed to the digital LPF 62, the output data of the switch 77 is fed to the flicker generating block 53 as the data of the amplitude γm', and the output data of the switch 78 is fed to the flicker generating block 53 as the data of the initial phase Φmn'.

The state detecting block 69 receives zooming information and hand-shake information. In response to the zooming information, the state detecting block 69 determines whether a large variation in the angle of view takes place in response to a zooming action, and in response to the hand-shake information, the state detecting block 69 determines whether a large variation in the angle of view takes place in response to panning and tilting actions and a large-amplitude hand shake.

If it is determined that no large variations take place in the angle of view, the state detecting block 69 sets the switches 75-78 to the sides thereof opposite from the sides of the memories 71-74. Normally, the flicker reduction operation is performed as in the example of FIG. 14.

If it is determined that a large variation takes place in the angle of view, the state detecting block 69 sets the switches 75-78 to the sides thereof to the memories 71-74.

Since the reliability of each of the amplitude γm and the initial phase Φmn drops when a large variation occurs in the angle of view, amplitude data and initial phase data acquired in the past and respectively stored in the memory 73 and the memory 74 are input to the flicker generating block 53 as the amplitude γm' and the initial phase Φmn.

Since the amplitude γm and the initial phase Φmn are steady during the mode A (in the state that the flickering is generated steadily and regularly under the illumination of the fluorescent lamp) as shown in FIG. 16, the use of the past data presents no problem at all. On the contrary, the past data should be positively used.

However, if low-reliability data is successively input to the digital LPFs 61 and 62 in the middle of variation in the angle of view, the amplitude γm' and the initial phase Φmn' obtained immediately subsequent to the setting of the switches 77 and 78 to the sides thereof opposite from the memories 73 and 74 suffer from error.

To eliminate such a problem, during the occurrence of a large variation in the angle of view, the state detecting block 69 not only sets the switches 77 and 78 to the sides thereof to the memories 73 and 74, respectively, but also sets the switches 75 and 76 to the sides thereof to the memories 71 and 72, respectively. With this arrangement, the low-reliability data are not input to the digital LPFs 61 and 62, and high-reliability data obtained prior to the occurrence of the large variation in the angle of view and stored in the memories 71 and 72 are input to the digital LPFs 61 and 62.

Regardless of the zooming information and the hand-shake information, the reliabilities of the amplitude γm and the initial phase Φmn are separately determined. Reliability level information as a result of determination is input to the state detecting block 69. If the reliability level information indicates that the reliability of the amplitude γm and the initial phase Φmn is low, the switches 75-78 are set to the sides thereof to the memories 71-74. In this way, past data having a high reliability is used.

<Advantages>

In accordance with the above-referenced embodiments, the flicker reduction operation is less sensitive to the external disturbance under the illumination of the fluorescent lamp and under the illumination of the non-fluorescent lamp, and still provides fast response and tracking features during the transitional state. The image pickup device performs the proper flicker reduction operation smoothly without discordance at the moment of the state transition, at the occurrence of the variation in the angle of view, or when the flicker detection parameter is low in reliability.

[Alternate Embodiments]

(Integration)

In each of the above-referenced examples, the input image signal In'(x,y) is integrated throughout one line. Since the input image signal In'(x,y) is integrated to obtain a sample value of the flicker component with the effect of a pattern of the image reduced, the integration may be performed throughout a plurality of lines rather than only one line. One period of the fluorescent light flicker (on-screen flicker) appearing as a striped pattern on the screen corresponds to L (=M*60/100) lines as previously described. If at least two sample values are obtained in one period, i.e., L lines, the flicker component is detected based on the sampling theorem.

In practice, a plurality of sample values, for example, at least 10 sample values are preferably obtained from one period, i.e., L lines of the on-screen flicker. Even in this case, the horizontal period of the input image signal In'(x,y) is integrated over a duration of time equal to or more than several times the horizontal periods, more particularly, ten times longer than the horizontal period. The integration time is not limited to an integer multiple of horizontal periods, and for example, 2.5 times the horizontal period is perfectly acceptable.

If the integration time is prolonged and a sample count per unit time is reduced, workload involved in the DFT operation by the DFT block 51 is lightened. When a subject moves in a vertical direction of the screen, the effect of the motion is reduced.

(Other Alternate Embodiments)

In the primary color system of FIG. 2, the flicker components in the RGB primary color signals is detected and reduced by the flicker reducers 25R, 25G, and 25B on a per color signal basis. Alternatively, the previously described flicker reducer 25 is arranged on the output side of the luminance signal Y of the synthesis matrix circuit 29 in order to detect and reduce the flicker component in the luminance signal Y.

In accordance with the above-referenced embodiments, the digital signal processor 20 including the flicker reducer 25 is implemented by hardware. Part or whole of the flicker reducer 25 or the digital signal processor 20 may be implemented by software.

In accordance with the above-referenced embodiments, the vertical synchronization frequency is 60 Hz (with one field period equal to 1/60 second). The present invention is applicable to a progressive type camera having a vertical synchronization frequency of 30 Hz (with one frame period being 1/30 second). In this case, three frame period (1/10 second) is an integer multiple (the stripe pattern of the flicker is 10 wavelengths over three frames) of the emission period of (1/100 second) of a fluorescent lamp, and the field of the above-referenced embodiment may be substituted for the frame.

The present invention is applicable to an XY addressing type image pickup element such as an image pickup element other than a CMOS image pickup element.

INDUSTRIAL APPLICABILITY

In accordance with the present invention, the flicker unique to the fluorescent lamp appearing in the XY addressing type image pickup element such as a CMOS image pickup element is detected and reduced reliably and sufficiently through the simple signal processing without using a photosensitive element regardless of the subject, the video signal level, and the type of the fluorescent lamp.

In particular, when the flicker reduction operation of the present invention is used for the RGB primary color signals, not only the light and dark flicker but also the color flicker is accurately detected, and reliably and sufficiently reduced.

If the level of the signal falls within the saturation region, the flicker reduction is disabled. In this way, the signal component is prevented from being affected by the flicker reduction operation.

The flicker reduction operation is disabled under the illumination of the non-fluorescent lamp. In this way, the effect of the flicker reduction operation on the image quality is controlled.

If the subject changes greatly in a short period of time in response to the operation or the action of the photographer, the immediately precedingly estimated flicker component or the flicker component estimated from the immediately preceding signal is calculated. In this arrangement, flicker detection accuracy is free from degradation due a large change in the subject happening in a short period of time.

The flicker reduction operation is disabled in the photographing condition that does not need the flicker reduction operation, for example, in the still image taking. In this way, the effect of the flicker reduction operation on the image quality is controlled.

The estimated flicker component is adjusted, and the adjusted flicker component and the input image signal are calculated. With this arrangement, the signal component is robust to the effect of external disturbance under the illumination of the fluorescent lamp and under the illumination of the non-fluorescent lamp. The image pickup device achieves excellent response and tracking features at the transition. Furthermore, the image pickup device performs the processes smoothly without discordance at the state transitions, at the variation in the angle of view, or when the reliability of the flicker detection parameters is low.

The invention claimed is:

1. A flicker reduction method for reducing a fluorescent light flicker component in a video signal or a luminance signal obtained by photographing a subject through an XY addressing type image pickup element under an illumination of a fluorescent lamp, comprising:

a step of integrating the video signal or the luminance signal, as an input image signal, throughout a duration of time equal to or longer than one horizontal period, a step of normalizing the integrated value or a difference value between the integrated values of adjacent fields or adjacent frames, a step of extracting a spectrum of the normalized integrated value or the normalized difference value, wherein a signal component other than a flicker component is extracted as the normalized integrated value or the normalized difference value, a step of estimating a flicker component from the extracted spectrum, wherein the estimated flicker component is approximated under the illumination of the fluorescent lamp to a predetermined order;

wherein an amplitude and an initial phase of the estimated flicker component is estimated for each order, and a step of performing a calculation operation on the estimated flicker component and the input image signal to cancel out the estimated flicker component.

2. A flicker reduction method for reducing a fluorescent light flicker component in each of color signals of colors obtained by photographing a subject through an XY addressing type image pickup element under an illumination of a fluorescent lamp, comprising:

a step of integrating the color signal of each color, as an input image signal, throughout a duration of time equal to or longer than one horizontal period, a step of normalizing the integrated value or a difference value between the integrated values of adjacent fields or adjacent frames, a step of extracting a spectrum of the normalized integrated value or the normalized difference value, wherein a signal component other than a flicker component is extracted as the normalized integrated value or the normalized difference value, a step of estimating a flicker component from the extracted spectrum, wherein the estimated flicker component is approximated under the illumination of the fluorescent lamp to a predetermined order;

wherein an amplitude and an initial phase of the estimated flicker component is estimated for each order, and a step of performing a calculation operation on the estimated flicker component and the input image signal to cancel out the estimated flicker component.

3. A flicker reduction method for reducing a fluorescent light flicker component in both a luminance signal and each of color signals of colors, obtained by photographing a subject through an XY addressing type image pickup element under an illumination of a fluorescent lamp, comprising:

a step of integrating each of the luminance signal and the color signal of each color, as an input image signal, throughout a duration of time equal to or longer than one horizontal period, a step of normalizing the integrated value or a difference value between the integrated values of adjacent fields or adjacent frames, a step of extracting a spectrum of the normalized integrated value or the normalized difference value, wherein a signal component other than a flicker component is extracted as the normalized integrated value or the normalized difference value, a step of estimating a flicker component from the extracted spectrum, wherein the estimated flicker component is approximated under the illumination of the fluorescent lamp to a predetermined order;

wherein an amplitude and an initial phase of the estimated flicker component is estimated for each order, and a step of performing a calculation operation on the estimated flicker component and the input image signal to cancel out the estimated flicker component.

4. The flicker reduction method according to claim 1, wherein the normalizing step comprises dividing the difference value by the average value of the integrated values of a plurality of consecutive fields or consecutive frames.

5. The flicker reduction method according to claim 1, wherein the normalizing step comprises dividing the difference value by the average value of the integrated values of a plurality of consecutive fields or consecutive frames, and subtracting a predetermined value from the resulting quotient.

6. The flicker reduction method according to claim 1, wherein the normalizing step comprises dividing the difference value by the integrated value.

7. The flicker reduction method according to claim 1, wherein the spectrum extracting step comprises Fourier transforming the normalized integrated value or the normalized difference value.

8. The flicker reduction method according to claim 1, wherein it is determined whether a level of the input image signal falls within a saturation region, and if it is determined that the level of the input image signal falls within the saturation region, the input image signal is output as is as an output image signal.

9. The flicker reduction method according to claim 1, wherein it is determined based on a level of the extracted spectrum whether the input image signal is from under the illumination of the fluorescent lamp, and if it is determined that the input image signal is not from under the illumination of the fluorescent lamp, the input image signal is output as is as an output image signal.

10. The flicker reduction method according to claim 1, wherein it is determined whether the subject changes greatly in a short period of time in response to an operation or an action of a photographer, and if it is determined that the subject changes greatly in a short period of time, one of an immediately precedingly estimated flicker component and a flicker component estimated from an immediately preceding signal, and the input image signal are subjected to a calculation operation.

11. The flicker reduction method according to claim 1, wherein it is determined whether a photographing condition requires a flicker reduction operation and if it is determined that the flicker reduction operation is determined to be unnecessary, the input image signal is output as is as an output image signal.

12. The flicker reduction method according to claim 1, wherein the estimated flicker component is adjusted and the adjusted flicker component and the input image signal are subjected to the calculation operation.

13. The flicker reduction method according to claim 1, wherein amplification data and initial phase data of the estimated flicker component are adjusted through respective low-pass filters, and a flicker component to be subjected to the calculation operation together with the input image signal is generated using the adjusted amplification data and the adjusted initial phase data.

14. The flicker reduction method according to claim 13, wherein the adjusted amplitude data and the adjusted initial phase data are stored in a memory, and if a predetermined condition is detected, the flicker component to be subjected to the calculation operation together with the input image signal is generated using the stored amplitude data and the stored initial phase data.

15. An image pickup device comprising:
an XY addressing type image pickup element,
means for integrating a video signal or a luminance signal, as an input image signal, throughout a duration of time equal to or longer than one horizontal period, the video signal or the luminance signal being obtained by photographing a subject through the XY addressing type image pickup element,
means for normalizing the integrated value or a difference value between the integrated values of adjacent fields or adjacent frames,
means for extracting a spectrum of the normalized integrated value or the normalized difference value,
wherein a signal component other than a flicker component is extracted as the normalized integrated value or the normalized difference value,
means for estimating a flicker component from the extracted spectrum,
wherein the estimated flicker component is approximated under the illumination of the fluorescent lamp to a predetermined order;
wherein an amplitude and an initial phase of the estimated flicker component is estimated for each order, and
means for performing a calculation operation on the estimated flicker component and the input image signal to cancel out the estimated flicker component.

16. An image pickup device comprising:
an XY addressing type image pickup element,
means for integrating a color signal of each color, as an input image signal, throughout a duration of time equal to or longer than one horizontal period, the color signal being obtained by photographing a subject through the XY addressing type image pickup element,
means for normalizing the integrated value or a difference value between the integrated values of adjacent fields or adjacent frames,
means for extracting a spectrum of the normalized integrated value or the normalized difference value,
wherein a signal component other than a flicker component is extracted as the normalized integrated value or the normalized difference value,
means for estimating a flicker component from the extracted spectrum,
wherein the estimated flicker component is approximated under the illumination of the fluorescent lamp to a predetermined order;
wherein an amplitude and an initial phase of the estimated flicker component is estimated for each order, and
means for performing a calculation operation on the estimated flicker component and the input image signal to cancel out the estimated flicker component.

17. An image pickup device comprising:
an XY addressing type image pickup element,
means for integrating each of a luminance signal and a color signal of each color, as an input image signal, throughout a duration of time equal to or longer than one horizontal period, the video signal and the luminance signal being obtained by photographing a subject through the XY addressing type image pickup element,
means for normalizing the integrated value or a difference value between the integrated values of adjacent fields or adjacent frames,
means for extracting a spectrum of the normalized integrated value or the normalized difference value,
wherein a signal component other than a flicker component is extracted as the normalized integrated value or the normalized difference value,
means for estimating a flicker component from the extracted spectrum,
wherein the estimated flicker component is approximated under the illumination of the fluorescent lamp to a predetermined order;
wherein an amplitude and an initial phase of the estimated flicker component is estimated for each order, and
means for performing a calculation operation on the estimated flicker component and the input image signal to cancel out the estimated flicker component.

18. The image pickup device according to claim 15, wherein the normalizing means divides the difference value by the average value of the integrated values of a plurality of consecutive fields or consecutive frames.

19. The image pickup device according to claim 15, wherein the normalizing means divides the difference value by the average value of the integrated values of a plurality of consecutive fields or consecutive frames, and subtracts a predetermined value from the resulting quotient.

20. The image pickup device according to claim 15, wherein the normalizing means divides the difference value by the integrated value.

21. The image pickup device according to claim 15, wherein the spectrum extracting means Fourier transforms the normalized integrated value or the normalized difference value.

22. The image pickup device according to claim 15, comprising means for determining whether a level of the input image signal falls within a saturation region, and outputting the input image signal as is as an output image signal if it is determined that the level of the input image signal falls within the saturation region.

23. The image pickup device according to claim 15, comprising means for determining, based on a level of the spectrum extracted by the spectrum extracting means, whether the input image signal is from under the illumination of the fluorescent lamp, and outputting the input image signal as is as an output image signal if it is determined that the input image signal is not from under the illumination of the fluorescent lamp.

24. The image pickup device according to claim 15, comprising means for determining whether the subject changes greatly in a short period of time in response to an operation or an action of a photographer, and if it is determined that the subject changes greatly in a short period of time, causing the calculating means to subject to the calculation operation, one of a flicker component immediately precedingly estimated by the flicker component estimating means and a flicker component estimated by the flicker component estimating means from an immediately preceding signal, and the input image signal.

25. The image pickup device according to claim 15, comprising means for determining whether a photographing condition requires a flicker reduction operation and if it is determined that the flicker reduction operation is unnecessary, outputting the input image signal as is as an output image signal.

26. The image pickup device according to claim 15, comprising adjusting means for adjusting the flicker component estimated by the flicker component estimating means and generating the flicker component to be subjected to the calculation operation together with the input image signal.

27. The image pickup device according to claim 15, comprising low-pass filter means for adjusting amplification data and initial phase data of the flicker component estimated by the flicker component estimating means, and generating the flicker component to be subjected to the calculation operation together with the input image signal.

28. The image pickup device according to claim 27, comprising storage means for storing the amplitude data and the initial phase data, adjusted by the low-pass filter means, and
  means for generating the flicker component to be subjected to the calculation operation together with the input image signal using the stored amplitude data and the stored initial phase data if a predetermined condition is detected.

29. A flicker reduction circuit for reducing a fluorescent light flicker component in a video signal or a luminance signal obtained by photographing a subject through an XY addressing type image pickup element under an illumination of a fluorescent lamp, comprising:
  means for integrating the video signal or the luminance signal, as an input image signal, throughout a duration of time equal to or longer than one horizontal period,
  means for normalizing the integrated value or a difference value between the integrated values of adjacent fields or adjacent frames,
  means for extracting a spectrum of the normalized integrated value or the normalized difference value,
  wherein a signal component other than a flicker component is extracted as the normalized integrated value or the normalized difference value,
  means for estimating a flicker component from the extracted spectrum,
  wherein the estimated flicker component is approximated under the illumination of the fluorescent lamp to a predetermined order;
  wherein an amplitude and an initial phase of the estimated flicker component is estimated for each order, and
  means for performing a calculation operation on the estimated flicker component and the input image signal to cancel out the estimated flicker component.

30. A flicker reduction circuit for reducing a fluorescent light flicker component in each of color signals of colors obtained by photographing a subject through an XY addressing type image pickup element under an illumination of a fluorescent lamp, comprising:
  means for integrating the color signal of each color, as an input image signal, throughout a duration of time equal to or longer than one horizontal period,
  means for normalizing the integrated value or a difference value between the integrated values of adjacent fields or adjacent frames,
  means for extracting a spectrum of the normalized integrated value or the normalized difference value,
  wherein a signal component other than a flicker component is extracted as the normalized integrated value or the normalized difference value,
  means for estimating a flicker component from the extracted spectrum,
  wherein the estimated flicker component is approximated under the illumination of the fluorescent lamp to a predetermined order;
  wherein an amplitude and an initial phase of the estimated flicker component is estimated for each order, and
  means for performing a calculation operation on the estimated flicker component and the input image signal to cancel out the estimated flicker component.

31. A flicker reduction circuit for reducing a fluorescent light flicker component in each of a luminance signal and each of color signals of colors, obtained by photographing a subject through an XY addressing type image pickup element under an illumination of a fluorescent lamp, comprising:
  means for integrating each of the luminance signal and the color signal of each color, as an input image signal, throughout a duration of time equal to or longer than one horizontal period,
  means for normalizing the integrated value or a difference value between the integrated values of adjacent fields or adjacent frames,
  means for extracting a spectrum of the normalized integrated value or the normalized difference value,
  wherein a signal component other than a flicker component is extracted as the normalized integrated value or the normalized difference value,
  means for estimating a flicker component from the extracted spectrum,
  wherein the estimated flicker component is approximated under the illumination of the fluorescent lamp to a predetermined order;
  wherein an amplitude and an initial phase of the estimated flicker component is estimated for each order, and
  means for performing a calculation operation on the estimated flicker component and the input image signal to cancel out the estimated flicker component.

32. The flicker reduction circuit according to claim 29, wherein the normalizing means divides the difference value by the average value of the integrated values of a plurality of consecutive fields or consecutive frames.

33. The flicker reduction circuit according to claim 29, wherein the normalizing means divides the difference value by the average value of the integrated values of a plurality of consecutive fields or consecutive frames, and subtracts a predetermined value from the resulting quotient.

34. The flicker reduction circuit according to claim 29, wherein the normalizing means divides the difference value by the integrated value.

35. The flicker reduction circuit according to claim 29, wherein the spectrum extracting means Fourier transforms the normalized integrated value or the normalized difference value.

36. The flicker reduction circuit according to claim 29, comprising means for determining whether a level of the input image signal falls within a saturation region, and outputting the input image signal as is as an output image signal if it is determined that the level of the input image signal falls within the saturation region.

37. The flicker reduction circuit according to claim 29, comprising means for determining, based on a level of the spectrum extracted by the spectrum extracting means, whether the input image signal is from under the illumination of the fluorescent lamp, and outputting the input image signal as is as an output image signal if it is determined that the input image signal is not from under the illumination of the fluorescent lamp.

38. The flicker reduction circuit according to claim 29, comprising means, under the control of external means, for causing the calculating means to perform the calculation operation on one of the flicker component immediately precedingly estimated by the flicker component estimating means and the flicker component estimated by the flicker component estimating means based on an immediately prior signal, and the input image signal.

39. The flicker reduction circuit according to claim 29, comprising means for outputting the input image signal as is as an output image signal under the control of external means.

40. The flicker reduction circuit according to claim 29, comprising means for performing the calculation operation on the flicker component, estimated by the flicker component estimating means and adjusted by the external means, and the input image signal.

* * * * *